United States Patent
Ge et al.

(10) Patent No.: US 10,372,458 B2
(45) Date of Patent: Aug. 6, 2019

(54) METHOD AND APPARATUS FOR A SELF-CLOCKED, EVENT TRIGGERED SUPERSCALAR PROCESSOR

(71) Applicant: HUAWEI TECHNOLOGIES CO., LTD., Shenzhen (CN)

(72) Inventors: Yiqun Ge, Kanata (CA); Wuxian Shi, Kanata (CA)

(73) Assignee: HUAWEI TECHNOLOGIES CO., LTD, Shenzhen, Guangdong (CN)

( * ) Notice: Subject to any disclaimer, the term of this patent is extended or adjusted under 35 U.S.C. 154(b) by 279 days.

(21) Appl. No.: 14/676,461

(22) Filed: Apr. 1, 2015

(65) Prior Publication Data

US 2016/0291980 A1 Oct. 6, 2016

(51) Int. Cl.
  *G06F 9/38* (2018.01)
  *G06F 9/355* (2018.01)
  *G06F 9/30* (2018.01)

(52) U.S. Cl.
  CPC ........ *G06F 9/3814* (2013.01); *G06F 9/30105* (2013.01); *G06F 9/3557* (2013.01); *G06F 9/3824* (2013.01); *G06F 9/3836* (2013.01); *G06F 9/3838* (2013.01); *G06F 9/3842* (2013.01); *G06F 9/3851* (2013.01); *G06F 9/3855* (2013.01); *G06F 9/3859* (2013.01); *G06F 9/3861* (2013.01);
  (Continued)

(58) Field of Classification Search
  CPC .... G06F 9/3885; G06F 9/3838; G06F 9/4436; G06F 9/3836; G06F 9/3842; G06F 9/3844
  See application file for complete search history.

(56) References Cited

U.S. PATENT DOCUMENTS 5,630,151 A * 5/1997 Muramatsu ........... G06F 9/4436
                                                              370/392
5,721,855 A * 2/1998 Hinton ................ G06F 9/30152
                                                              711/E12.049
(Continued)

FOREIGN PATENT DOCUMENTS

CN          1092881 A          9/1994
CN          1224871 A          4/1999

OTHER PUBLICATIONS

Rakfet Kol (Kol, Rakefet. "Self-Timed Asynchronous Architecture of an Advanced General Purpose Microprocessor." (1997).).*
(Continued)

*Primary Examiner* — Eric Coleman
(74) *Attorney, Agent, or Firm* — Norton Rose Fulbright Canada LLP

(57) ABSTRACT

A superscalar processor, for out of order self-timed execution, comprising a plurality of independent self-timed function units, having corresponding instruction queues for holding instructions to be executed by the function unit. The processor further comprising an instruction dispatcher configured for inputting instructions in program counter order; and determining an appropriate function unit for execution of the instruction and a resource management unit configured for monitoring the function units and signaling availability of the appropriate function unit, wherein the dispatcher only dispatches the instruction to the appropriate function unit in response to the availability signal from the resource management unit.

19 Claims, 15 Drawing Sheets

(52) U.S. Cl.
CPC .......... *G06F 9/3869* (2013.01); *G06F 9/3871* (2013.01); *G06F 9/3885* (2013.01)

(56) References Cited

U.S. PATENT DOCUMENTS

| | | | |
|---|---|---|---|
| 5,745,725 A * | 4/1998 | Simpson | G06F 9/3836 |
| | | | 712/214 |
| 5,838,940 A * | 11/1998 | Savkar | G06F 9/3802 |
| | | | 712/200 |
| 5,987,620 A * | 11/1999 | Tran | G06F 1/10 |
| | | | 712/E9.062 |
| 6,192,461 B1 | 2/2001 | Williamson et al. | |
| 6,209,081 B1 | 3/2001 | Kahle et al. | |
| 7,007,277 B2 * | 2/2006 | Hildebrand | G06F 9/50 |
| | | | 718/104 |
| 2003/0172250 A1 * | 9/2003 | Fetzer | G06F 9/3851 |
| | | | 712/206 |
| 2004/0139299 A1 | 7/2004 | Busaba et al. | |
| 2005/0246340 A1 * | 11/2005 | Smith | G06F 13/362 |
| 2010/0318998 A1 * | 12/2010 | Golla | G06F 9/5011 |
| | | | 718/104 |
| 2012/0089819 A1 * | 4/2012 | Chaudhry | G06F 9/3838 |
| | | | 712/214 |
| 2014/0215188 A1 | 7/2014 | Mylius et al. | |
| 2015/0169376 A1 * | 6/2015 | Chang | G06F 9/48 |
| | | | 718/104 |
| 2015/0370738 A1 * | 12/2015 | Godard | G06F 13/4022 |
| | | | 710/317 |

OTHER PUBLICATIONS

Richardson et al. (W. F. Richardson and E. Brunvand, "Architectural considerations for a self-timed decoupled processor," in IEE Proceedings—Computers and Digital Techniques, vol. 143, No. 5, pp. 251-258, Sep. 1996.*

* cited by examiner

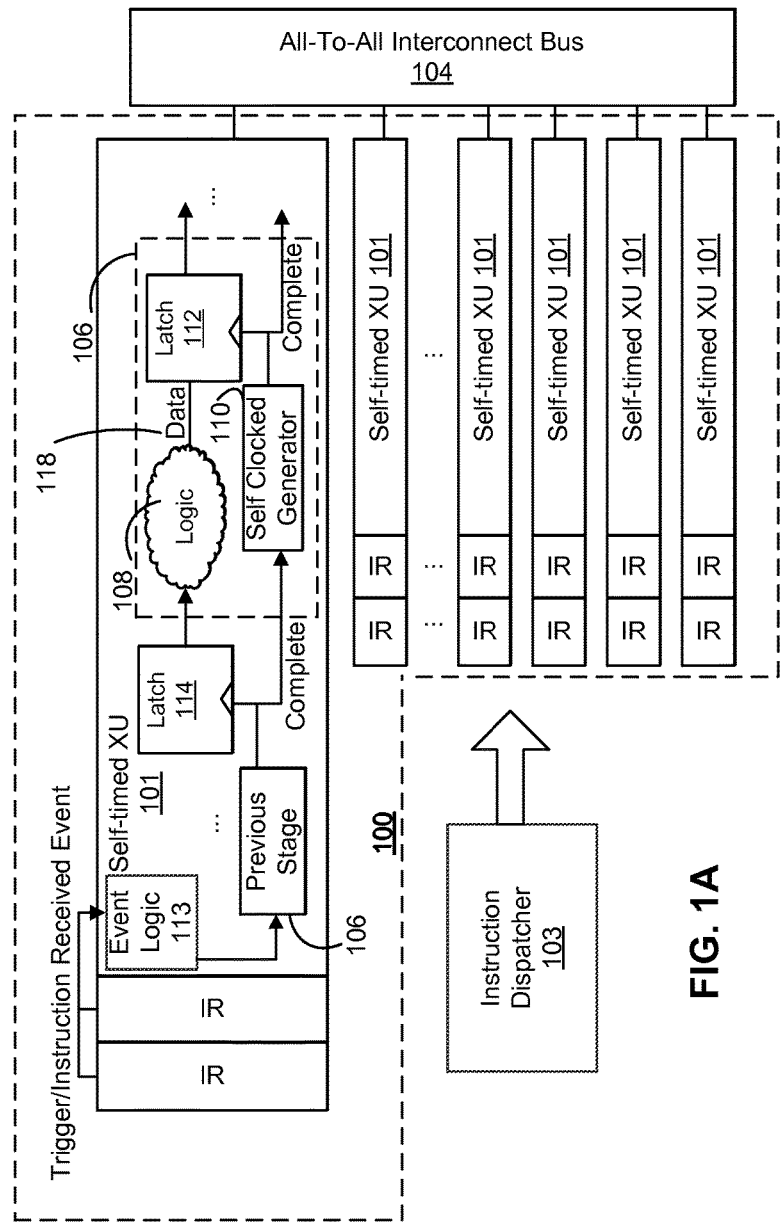
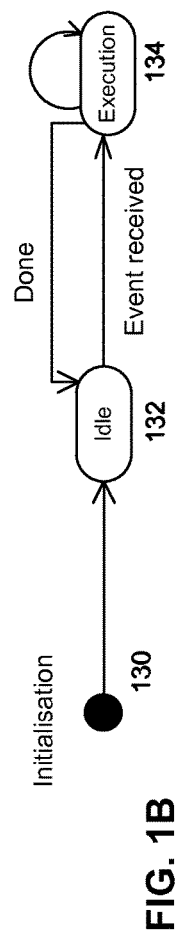
FIG. 1A
FIG. 1B

METHOD AND APPARATUS FOR A SELF-CLOCKED, EVENT TRIGGERED SUPERSCALAR PROCESSOR

TECHNICAL FIELD

The present disclosure relates to a superscalar processor, and in particular relates to the superscalar processor architecture and its operation.

BACKGROUND

One measure of performance for a computer processor is known as a power-efficiency ratio, which measures the performance of the processor per watt of energy consumed. As computing devices become smaller and more powerful, demand is increasing for higher performance and lower power consumption in processors.

One factor in achieving better performance in a processor is parallelism, particularly instruction-level-parallelism (ILP). Unlike a specific hardware accelerator such as an application specific integrated circuit (ASIC), a processor is instruction-driven and programmed with corresponding software. A typical computer program is a list of instructions which, when compiled or assembled, generates a sequence of machine instructions or operations that a processor executes. The operations have a program order defined by the logic of the computer program and are generally intended for sequential execution in the program order. Scalar processors execute the operations in the program order, which limits a scalar processor to completing one operation before beginning the next operation.

A superscalar processor architecture implements ILP within a single processor. Due to the parallelism, a superscalar processor allows faster processor throughput than would otherwise be possible at a given clock rate. A superscalar processor executes more than one instruction during a clock cycle by simultaneously dispatching multiple instructions to different function units on the processor. Each function unit is not a separate core, but is instead an execution unit such as an arithmetic logic unit, a bit shifter, or a multiplier, among other options, within a single processor.

One factor affecting power consumption in any processor is the global clock tree. The global clock tree is usually deployed throughout the processor to synchronise and drive function units, such as instruction decoders, schedulers, execution units, register files, buffers, and the like. Larger processors have a correspondingly larger number of function units, and specifically execution units and buffers, which require a larger global clock tree to synchronize these resources. The larger global clock tree results in higher power consumption. It is estimated that a global clock tree consumes about 20%~30% of the total power of a processor. Another problem with the global clock tree is that when function units are not used at a particular moment their clocks are still toggled, thus consuming power unnecessarily.

SUMMARY

In one embodiment, the present disclosure provides a superscalar processor having a plurality of parallel self timed function units, an instruction dispatcher configured to dispatch instructions to function units in a program counter order, and event logic associated with each of the plurality of function units. In the superscalar processor, the event logic is configured to trigger operation of its associated function unit to generate an instruction execution result in response to receipt of a dispatched instruction at the function unit, where execution results among the plurality of parallel function units are unconstrained to be generated in program counter order.

In one embodiment, the present disclosure provides for a method in a superscalar processor, the method including operating a plurality of parallel function units, each function unit generating an instruction execution result, dispatching instructions from an instruction dispatcher to the function units in a program counter order, and triggering operation of the function unit in response to arrival of a dispatched instruction at the function unit. In the method, execution results among a plurality of operating execution units are unconstrained to be generated in program counter order.

BRIEF DESCRIPTION OF THE DRAWINGS

The present disclosure will be better understood with reference to the drawings, in which:

FIG. 1A is a block diagram of an architecture of self-timed execution units in accordance with an aspect of the present disclosure;

FIG. 1B is a state diagram of a self-timed execution unit in accordance with the an aspect of the present disclosure;

DETAILED DESCRIPTION OF THE DRAWINGS

Figure 2:
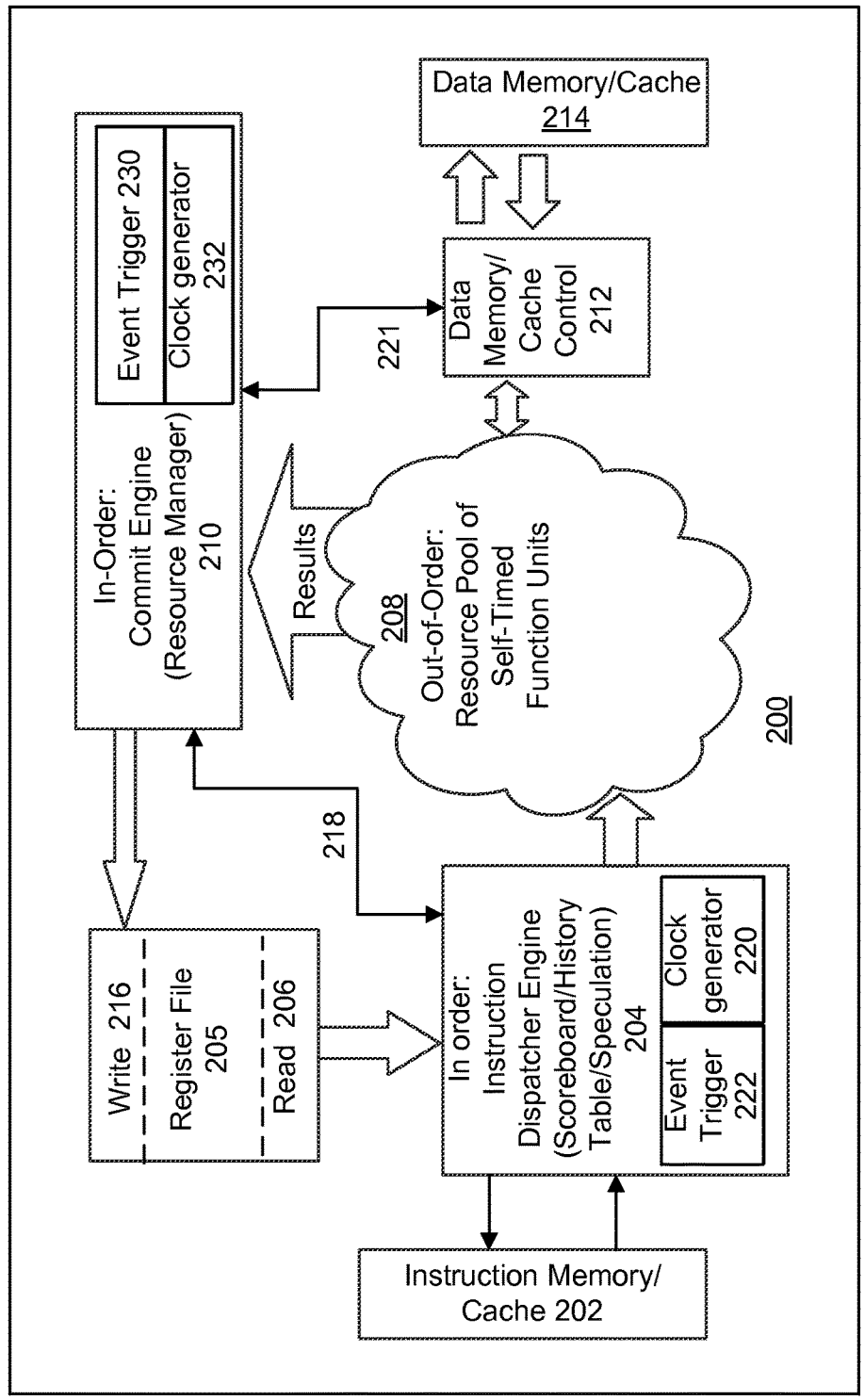
FIG. 2 is a block diagram of a processor in accordance with an aspect of the present disclosure.

The following are some of the abbreviations used in this disclosure:
AGU—address generation unit;
ALU—arithmetic logic unit;
AR—address (scalar) register;
COF—change of flow;
EA—effective Address;
FIFO—first in and first out;
FPMU—floating point measurement unit
ILP—instruction level parallelism;
IR—instruction register;
LD—load
MAC—multiply-accumulate;
MU—multiplication unit;
OP—operand
PC—program counter;
SMT—simultaneous multithreading;
VLUT—vector look-up-table;
VALU—vector ALU;
VMAC—vector MAC;
VR—vector register;
XU—execution unit.

As used herein, an event is defined as an action that results in execution being started in an execution entity. In other words, an execution entity may wait for an event before entering an execution state. For example, arrival of an instruction at a function unit triggers execution in the function unit based on its own clock circuit. In this way, a global clock tree is avoided or replaced by many distributed clock-on-demand circuits that are self-timed.

The present disclosure is directed to a reduction in the reliance on a global clock tree within a processor architecture. The reduction may be implemented using self-timed circuits as function units. In the architecture described below, instead of deriving the clock signal from a common global clock tree, function units are self-timed or even clock-less. The function unit may include an event-triggered clock.

The processor includes a resource pool comprising a plurality of the function units. The function units may be allocated to new instructions when a function unit is ready. The function units may generate execution results out of order without regard to other function units in the pool.

A central resource manager is utilized for a variety of purposes, including: managing allocation of function units in the resource pool; dispatching instructions; and commitment of execution results from the resource units so that commitment is done in an original serial order of instructions being fetched. Commitment is the storing of the execution results to a register file or memory.

Accordingly, embodiments of the present disclosure provide for a superscalar processor comprising: a plurality of independent self-timed function units, having corresponding instruction queues for holding instructions to be executed by the function units; an instruction dispatcher configured for inputting instructions in program counter order and determining appropriate function units for execution of instructions; a resource manager configured for monitoring function units and signaling availability of an appropriate function unit, upon which the dispatcher only dispatches the instruction to that appropriate function unit in response to the availability signal from the resource manager; event logic associated with each of the plurality of function units, each event logic is configured to trigger operation of its associated function unit in response to arrival of the dispatched instruction at the function unit. In the superscalar processor, the plurality of function units are each operable to generate results independently of each other, and the generated results among the plurality of function units are unconstrained to be in program counter order.

Embodiments of the present disclosure further provide for function units that each utilize a configurable self-clocked generator to trigger the generation of a clock signal.

Embodiments of the present disclosure further provide for architecture and methods for an out-of-order self-timed superscalar processor, where multiple instructions are executed concurrently by employing multiple self-timed function units. In such architecture, instruction level parallelism is exploited for out-of-order execution, where independent instructions may be executed before preceding ones that are waiting for data and/or resources.

Embodiments of the present disclosure further provide for the serial nature of program code to be preserved such that executed instructions are committed in their original serial order. All commitment and instruction dispatch is managed and controlled by a central resource manager.

Embodiments of the present disclosure further provide for treatment in strict order of: branches; flushes up to a PC determined section; exceptions; and interrupts. In other words, precedent instructions may be safely committed, whereas instructions after a current instruction may be revoked or discarded properly as required. A flush is the revocation of in-flight instructions such that they are never committed. An exception may be characterized as an abnormal result of an operation on some particular operands, that requires special processing.

Embodiments of the present disclosure further provide for dynamically allocating resources, such as computation, memory port and register read/write ports, without contentions. In other words, embodiments of the present disclosure may avoid any contention or avoid a stall for any contention.

Embodiments of the present disclosure further provide for forwarding and bypassing to increase ILP, where a result of an instruction from a given function unit can be immediately used by other dependent instructions instead of writing into the register file and then being read out one at a time.

Embodiments of the present disclosure further provide a method and system for control hazard mitigation. For example, such method may include discarding a request to offset an instruction address in the instruction memory and revoking any in-flight instructions such that they are never committed. An offset is typically some value added to a base address. For example, an offset of zero specifies the base address.

Embodiments of the present disclosure further provide a method and system for speculation, which is defined as execution of an instruction before it is known whether the instruction needs to be evaluated at all. Speculation may be implemented in a pre-dispatcher part of the processor which may attempt to speculate one branch if receiving a branch instruction. The speculation may depend on statistical measurements over previous branch results from the same branch instruction. All speculation may be recorded and all flush requests may be recorded. An incorrect speculation may underscore the statistical measurement of this branch instruction, and vice versa.

Embodiments of the present disclosure further provide for superscalar processor architecture using self-timed function units.

The above embodiments may be implemented utilizing various processor blocks. These may include self-timed function units, a dispatcher unit, a commit engine, instruction memory, registers, data cache/memory and a data cache/memory controller, which are each described in detail below.

A first element of a superscalar processor is a self-timed function unit, as described with regards to FIGS. 1A and 1B. Reference is now made to FIG. 1A, which shows an example of self-timed resource 100 according to one embodiment of the present disclosure. The resource includes a plurality of self-timed function units, consisting of execution units (XU) 101, in parallel. In the illustrated embodiment, each XU 101 is connected to an all-to-all interconnect bus 104, for outputting results and inputting results from other XUs.

In one embodiment, XUs 101 may be fed instructions from a dispatcher 103.

Each XU 101 may include one or more successive processing stages 106. Such processing stages may be used for processing instructions from instruction dispatcher 103, with each having an asynchronous logic block 108, an associated self-clocked generator block 110, and a data storage element or latch or flip-flop or register 112 for storing data 118 output from the logic block 108.

In addition, each XU may include one or more instruction registers (IR). The registers, also referred to as buffers or docks, hold the received instructions so that the XUs retain the freedom to execute independently of each other. In other words, each XU is not constrained by the timing of others of the XUs. Each of the XUs and/or the associated instruction register(s) may include event logic 113 to trigger execution of the XU based on a defined event, such as the arrival of an instruction in the instruction register.

Execution may commence in the XU upon arrival of an instruction in the instruction register. In some embodiments, the actual processing of the instruction may not commence immediately upon arrival of the instruction in the instruction register. For example, the XU may wait until all the source operands for the instruction are available.

As will be appreciated, for each stage, data processed by the respective logic block is output and latched into its respective data latch 114 upon receipt of an active "complete" signal from the self-clocked generator associated with that stage.

Returning to logic block 108, the logic block 108 may be any block or combination of processing logic configured to operate asynchronously as a unit. Some examples of logic block 108 are an arithmetic logic unit (ALU), adder/multiplier unit, and memory access logic. In one example, the logic block 108 may be configured to perform at least two different functions, such as an adder/multiplier unit. In this example, the logic block 108 has two processing time delays: the processing time delay to complete the adding function and the processing time delay to complete the multiplication function. In other words, a period of time between triggering processing of the logic block 108 and a latching of the result from the logic block 108 is the operational time delay—the sum of the two processing delays.

Data processed from a previous stage 106 is latched into the data latch 114. Once the previous stage 106 has completed its processing cycle, a previous stage completion signal is input to the next stage self-clocked generator 110, indicating that the previous stage 106 has completed processing and the data in the data latch 114 is ready for further processing by the subsequent stage 106.

The previous stage completion signal triggers the self-clocked generator 110 and activates self-clocked generator 110 to generate its own current active complete signal. If the complete signal is generated by the active stage when it starts processing, the self-clocked generator 110 may delay outputting the current completion signal for a predetermined period of time to allow the logic block 108 to fully process the data and output the processed data. Alternatively, the delay may be from the logic block 108 waiting for a result from another XU to be output on the interconnect bus.

The self-timed function units of FIG. 1A allow a global clock tree to be avoided or replaced by many distributed clock-on-demand circuits that are self-timed.

The arrival of an instruction at the IR of an XU 101 may act as an event to trigger the processing stages of the XU. Reference is now made to FIG. 1B, which shows a state diagram for the XU 101.

Following initialisation 130 which is usually at processor start-up, the XU 101 moves to an idle state 132. The XU waits in idle state 132 for an event, such as the receipt of an instruction.

Upon the event occurring, the XU moves to an execution state 134, where the execution of the instruction is performed.

Once execution is done and a result is generated, the XU transitions from the execution state 134 back to the idle state 132, awaiting the next event.

As may be appreciated, the timing for transitions between states or length of time in a particular state at each XU 101 is independent of the other XUs or a global clock.

As described above in an aspect of the present disclosure, function units that are self-timed do not require the use of a global clock tree. In another aspect of the present disclosure, an all-to-all interconnect bus between such self-timed function units is provided. In one embodiment, the all-to-all interconnect bus may be clock-less as well.

Various factors may be taken into account for implementing a superscalar processor with event driven function units. These may include timing mismatches between function units, access conflicts between the self-timed circuits, and possibly non-deterministic behavior and states for individual circuits of the function units. A processor that is built with multiple self-timed function units should accommodate these various factors.

As described above, one factor in achieving better performance in a processor is parallelism, particularly ILP. Unlike a specific hardware accelerator, such as an application specific integrated circuit, a processor is instruction-driven and programmed with corresponding software.

A computer program may include data dependencies among instructions. A parallel processor tries to pick the independent instructions and send them to different function units to maximize the parallelism. The procedure is called scheduling. Scheduling can be implemented either by software (static scheduling), or hardware (dynamic scheduling).

Static scheduling simplifies hardware design and consumes less power. But, being static, scheduling is difficult to change based on a current status of the processor. Therefore, the static scheduling instruction stream must be in a strict order of the program code. Typically, to avoid potential structural hazards (also known as resource conflicts) the static scheduler (or compiler) tends to add more empty instructions e.g. null operands (NOP)) into the instruction stream, which reduces the performance efficiency, reduces the effective instruction fetch bandwidth, and enlarges the instruction space.

Further, for self-timed circuits, the execution period on a self-timed function unit is not deterministic, unlike with a global clock tree. This presents an obstacle for a static scheduling algorithm that requests the deterministic operation period to calculate the availability of a function unit and to resolve structural hazards.

Unlike static scheduling, one advantage of dynamic scheduling is that hardware may adaptively allocate instructions to function units as they become available. Thus, a processor executes instructions in an order governed by the availability of input data, rather than by the original order of the instructions in a program. In other words, dynamic scheduling allows for out-of-order execution.

Since a dynamic scheduler may dispatch the instructions to the function units in an out-of-order way and such instructions are executed out-of-order, a challenge is to maintain in-order commitment. Commitment is defined as an operation that changes the processor's state irrevocably. Examples of commitment include, but are not limited to, writing into a register file, storing into the memory, among other possibilities. While instructions may be dynamically scheduled for execution in an out-of-order manner, commitment should be done in-order to ensure the results of the execution of the program code, which may also be out-of-order, are committed in PC order. Commitment in-order ensures that results are correctly associated to the instructions which were fetched in PC order.

Further, even with out-of order execution, exceptions in the program code need to be handled. Since instructions are executed concurrently and out-of-order, interrupt and exception handling may pose a problem. Latency, cost, and performance degradation are considerations in evaluating the effectiveness of exception handling schemes. Difficulties in out-of-order execution arise because one instruction may depend on another, where the logic of a computer program requires that the first instruction in the program be executed before the second instruction.

A superscalar processor should treat branches to a program code section, a flush up to some program code section, exceptions, and interrupts in a strict order. Specifically, the instructions precedent to branches, interrupts and exceptions should be safely committed, whereas those after such branches, interrupts and exceptions should be capable of being revoked or discarded.

Further, a superscalar processor may engage in speculation. Specifically, whether an operation should be executed at all often depends on the result of a branch operation. As is well known, processors often attempt to predict or guess the result of a branch operation (e.g. an if-then-else instruction) before the result can be definitively determined. The processor may proceed with executing operations that depend on the result of the branch operation based on the prediction. The execution is termed speculative, since the branch prediction may be incorrect, resulting in the wrong operations being executed, or operations being executed based on incorrect inputs.

Additionally, many computers require that a system's state be known just before or after an operation generates an error, interrupt, or trap; but when operations are executed out-of-order, an operation which follows an error in a program may have been executed before the error occurred. Thus, the processor should be able to undo operations which should not have been executed, and should further be able to construct the system's state following an error.

In a further aspect of a superscalar processor, conflicts, also known as hazards, between instructions should be handled to avoid a stall in execution of the code. There are typically three types of hazards, namely, data hazards, structural hazards, and control hazards. A data hazard is created whenever there is dependence between instructions, and such instructions are close enough that the overlap caused by parallel execution would change the order of access to an operand.

For example, consider two instructions, i and j, with i occurring before j. Possible data hazards are:
  RAW (read after write)—j tries to read a source before i writes to it, so j incorrectly gets the old value. This is the most common type of hazard. Forwarding by feeding output data into a previous stage of a pipeline is typically used to overcome this hazard.
  WAW (write after write)—j tries to write an operand before it is written by i. The writes end up being performed in the wrong order, leaving the value written by i rather than the value written by j in the destination.
  WAR (write after read)—j tries to write to a destination before it is read by i, so i incorrectly gets the new value.

A structural hazard occurs when there is a contention for resources, such as computation resources, memory ports, or register read/write ports. Techniques for overcoming such structural hazards relate to dynamic allocation of resources in a manner that avoids contentions or stalls.

Control hazards are usually branching hazards as described above.

One aspect of the present disclosure provides for forwarding or bypassing to increase instruction-level-parallelism, where the result of an instruction on a given resource can be "immediately" used by other dependant instructions, instead of writing into a register file and then being read out one at a time, as described in more detail below.

Referring now to FIG. 2, there is shown a block diagram of a high level architecture 200 of a superscalar processor according to an aspect of the present disclosure. The superscalar processor architecture 200 includes: an instruction memory/cache 202; an instruction dispatcher engine 204 with scoreboard logic; a register file 205 having a read port 206 and a write port 216; a pool 208 of computation or function units (resource pool) including self-timed or clock-on-demand execution units, which may be a plurality of the self-timed (asynchronous) XUs 101 in parallel as described with reference to FIGS. 1A and 1B; an all-to-all interconnect bus 209; an in-order commit engine 210 which reads results from the interconnect bus 209, maintains an inventory/queue for managing resources and controls commitment of every instruction; a data memory cache control 212; and data/memory cache 214.

The instruction dispatcher engine 204 is configured to dispatch one or more instructions received from instruction memory/cache 202 to the pool of function units 208. In one embodiment, instruction dispatcher engine 204 may be self-clocked by an internal clock generator 220, and thus not linked to a global clock tree. In such case, the dispatcher engine 204 may include an event trigger 222.

The function units 208 are self-timed. No global clock tree is implemented. Once an instruction is ready and a target function unit is ready, the instruction is dispatched to the target function unit along with a pre-defined latency value. The arrival of the instruction triggers a clock pulse for the function unit to begin its operation, shown with event triggers 222 in FIG. 2. The results of the function units 208 are output to the interconnect bus 209 for other function units and also for the commit engine 210.

The interconnect bus 209 that links all the function units may also be clock-less and event driven.

In other embodiments, rather than implementing the interconnect bus 209, the interconnection between the plurality of function units 208 for sharing results may be achieved in other ways, such as a crossbar, ring network, mesh network, or broadcast.

The instruction memory/cache 202 holds instructions for dispatch.

Memory 214 provides typical data storage functions. Similarly, the register file 205 provides typical register storage functions.

As indicated above, the commit engine 210 controls writing into the register file 205. Neither the pool of function units 208 nor the memory/cache control 212 can write directly into the register file 205. This is to allow only the commit engine 210 to write data to the register file. Once data is committed to the register file, it changes the state of the processor. Recall that it is the commit engine 210 that is used to ensure in-order commitment of results.

Further, the commit engine 210 may include an event trigger block 230 such that execution in the commit engine may also be event-triggered. The commit engine 210 may also include an internal clock generator 232. In the example of FIG. 2, a self-clocked commit engine 210 is shown. In this case, any available results on the interconnect bus 209 would trigger the events in the commit engine 210. Once the commit engine 210 completes a transaction it may, in turn, trigger other events to the other components.

A request from the dispatcher engine 204 may also act as a trigger event for the commit engine 210.

The instruction dispatcher engine 204, the commit engine 210, and pool 208 of function units may all be event driven and do not have to strictly follow a global clock or be coupled to a global clock tree.

The operation of the processor architecture 200 is described below. In a first aspect of operation, fetch, dispatch and resource allocation instructions are described.

At a very general level, an instruction stream is fetched in an order determined by program code from the instruction memory/cache 202 to the dispatcher engine 204. At dispatcher engine 204, the instructions are then dispatched to the resource pool 208 when a function unit in the pool 208 that is required by the instruction is available.

The fetched instruction may have a tag associated therewith or be encoded to indicate to the dispatcher engine 204 a particular type of resource for its execution. The dispatcher engine 204 checks with the commit engine 210 whether the required target resource is available, as shown by arrow 218.

The commit engine 210 is configured as a resource manager, and maintains an inventory of the resources in the resource pool 208. Commit engine 210 further maintains a status for use in controlling the in-order commitment of every instruction dispatched, including calculations, memory access, and branch instructions.

Once the commit engine 210 indicates that the requested resource is available for re-allocation and informs the dispatcher engine 204 of such, the commit engine 210 allocates the target resource in an inventory.

Based on the information provided in the indication from commit engine 210, the dispatch engine 204 sends the new instruction to the target resource in the resource pool 208.

From the above, the commit engine 210 manages potential structural hazards in the processor by managing and allocating the resources.

In a further aspect of operation, the dispatcher engine 204 may also perform score-boarding. Specifically, while the dispatcher engine 204 is checking for available resources as described above, the dispatcher engine 204 is also score-boarding each instruction by registering every dispatched instruction and identifying the data dependency for every incoming new instruction.

The dispatcher engine 204 uses the score-boarding to monitor each instruction waiting to be dispatched, and maintains a history of instructions dispatched, including a status of commitment. If the commit engine 210 commits an instruction, the scoreboard is instructed by the commit engine 210 to retire the instruction from the history table.

When a new instruction is fetched by the dispatcher engine 204, the dispatcher engine 204 decodes the instruction's source operands and then checks the scoreboard history table for previous instructions whose results are required by these operands. Dispatcher engine 204 reads the register file 205 for any available results.

In one embodiment, information about dependent previous instructions and their allocated function unit identifiers may be tagged to the fetched instruction. The tag information may be used by the target function unit within the pool of function units 208 to fetch data directly from the interconnect bus 209 as soon as it is available from the previous instructions' function unit (not shown).

When the decoded instruction is ready to be dispatched, the dispatcher engine 204 registers the instruction and its destination operand(s) into the history table. In one embodiment, the dispatcher engine 204 will stall if a targeted function unit is unavailable. However, if the operand or data value is unavailable, dispatcher engine 204 may still continue to dispatch the instruction to an allocated function unit. The function unit receiving the instruction will wait for its operand value at the dock, i.e. IR of the target resource. The dispatcher engine 204 thus manages potential data hazards.

In a further aspect of operation within processor architecture 204, out-of-order operation is provided. The resource pool of function units 208 includes clock-on-demand circuits, as for example described above in reference to FIGS. 1A and 1B. In other words, as described above, instead of implementing a global clock tree to synchronize all function units, every function unit 208 has its own pulse generator that is event triggered.

The arrival of the dispatched instruction at the designated resource acts as an event that triggers execution for that instruction at the function unit.

In some cases, the instruction may not have all its operands available and may be waiting upon the result of a dependent function unit. In this case, as all the function units may be inter-connected through the all-to-all interconnect bus 209, when the result of the dependent function unit is output onto the interconnect bus 209, the result may be immediately available for any of the other function units to read.

The dependent function unit may be identified using a resource unit identifier. As described above, the instruction dispatched to a given function unit may be tagged with the dependent function unit identifier. In this way, a designated function unit will monitor the interconnect bus 209 for a dependent function unit identifier in order to pull the result from the interconnect bus 209 once it becomes available.

When a function unit finishes executing an instruction, it outputs the result onto the interconnect bus 209 and may also broadcast a ready signal.

Thus, while the instructions are dispatched by dispatcher engine 204 in-order to the resource pool 208, the function units may execute the instructions out-of order and generate results out-of-order. Instructions are processed in a self-timed, and independent manner when the operands of the particular instruction become available.

The timing for triggering of the function units and execution in the function units is not dependent on a global clock tree or tied to other function units.

As may be appreciated, the resource pool 208 does not directly write to memory, but transacts with the memory/cache controller 212. The memory access transaction may be divided into loading and storing.

The loading of data from the data memory/cache 214 can be speculative, because the loading of the data from the memory/cache 214 does not necessarily change a state of the processor permanently. Loaded data may therefore be considered speculative until the loaded data is written into the register file 205.

Conversely, the storing of data cannot be speculative because it changes the memory permanently and potentially resulting in a data hazard. Thus storing is a transaction of the commit engine 210.

Based on the above, the resource pool 208 handles loading and storing of data differently.

For the loading of data from memory 214, an address-generator unit (AGU) function unit in the resource pool 208 calculates an effective address of the data and sends it to the memory controller 212 on the interconnect bus 209, since the memory controller is also connected to the interconnect bus.

The data memory/cache control 212 returns the loaded data from this effective address to the AGU, which then outputs it onto the interconnect bus for use by any other function units in the pool 208. The automatic return to the AGU may be implemented by having an AGU identifier (AGU-ID) sent with a load request to the memory.

In one embodiment, the memory is configured as a first-in-first-out (FIFO) queue. The memory controller tags the AGU-ID to the loaded data sent back from the data memory/cache 214 and sends the loaded data to the AGU on the interconnect bus 209 to ensure that the AGU knows to look for this tagged data on the interconnect bus 209.

For the storing of data, the AGU calculates the effective address and pushes it on a results bus of interconnect bus 209, which is then pulled by the commit engine 210. The AGU also outputs data to be stored onto the interconnect bus. However, the memory controller 212 cannot perform the storing to the data memory/cache 214 until the commit engine 210 issues a commit-signal, shown by arrow 221, for this storing.

The storing of data, either to the register file 205 or to the data memory/cache 214, is controlled by the commit engine 210. Once the results are posted on the interconnect bus 209, the commit engine 210 automatically pulls them. Because the commit engine 210, as described above, has already allocated the resource for a given instruction (it has already allocated a position in its inventory/queue), it will store or associate the result in a position corresponding to that allocated resource in its queue.

In one embodiment, the commit engine 210 may be implemented as a FIFO queue, in which case only the instruction at the head of the queue is committed, and the corresponding resource is released to be available for a newly incoming instruction. A later instruction may be moved to the head of the queue as a result of, for example, a register-written operation that changes the register file 205, a COF operation that requests a flush, an offset of the PC in the dispatcher 204, or a storing operation that changes the memory 214. In other embodiments, the commit engine FIFO queue may be implemented as several interlaced tables, or as a reorder buffer (ROB).

Since the data memory/cache controller 212 is responsible for memory access, including loading and storing, it deals with memory conflicts or hazards in the following manner. When an effective loading address is pushed into interconnect bus 209, the data memory/cache controller 212 will compare it with all pending storing addresses. If there is no conflict, data memory/cache controller 212 executes the operation at the memory reference. Otherwise, data memory/cache controller 212 queues the loading address until the conflicting storing operation is finished and the conflict no longer exists.

When an effective storing address is pushed, the controller 212 simply buffers it. When storing content at an address that is pushed from the commit engine 210, the controller 212 will retire the corresponding storing address contained in its buffer and reference this store to the memory 214.

Figure 3:
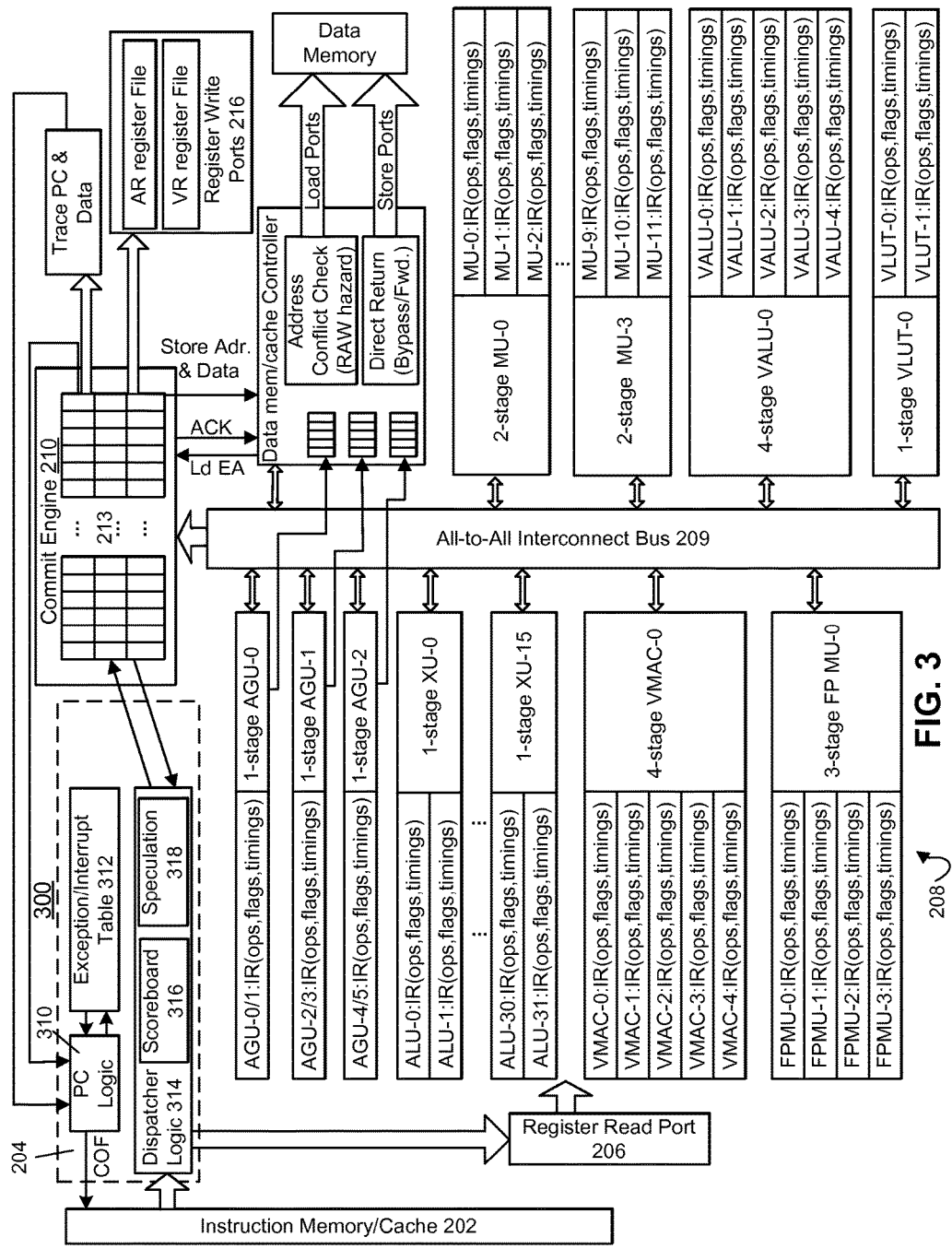
FIG. 3 is a block diagram of an example implementation of the processor in FIG. 2.

Referring now to FIG. 3, there is shown a block diagram 300 of one implementation of the processor 200. The various blocks referred to in FIG. 2 will be discussed in more detail below. The dispatcher engine 204 includes a program code logic block 310, which includes a speculation block, an exception/interrupt table 312, dispatcher logic 314 including scoreboard logic 316, and a speculation block 318. Further, the instruction dispatcher engine 204 is connected to the instruction memory/cache 202, commit-engine 210, register file reading ports 206, and resource pool 208. In the embodiment of FIG. 3, the resource pool 208 includes multiple self-timed function units, each having several docks (IR), or buffers connected to the physical function unit.

In order to increase the depth of the pipeline to a physical function unit, one physical self-timed clock-less function unit may have several docks (or buffers). Thus, instead of directly pushing an instruction from the dispatcher 204 to the physical function unit, the instruction is pushed to the dock. Accordingly, this allows the commit engine 210 to base its resource allocation on the docks rather than on the physical function unit as a whole. Thus, the same physical function unit may be allocated to several instructions, depending on the number docks available to that physical function unit. The docks hold the instruction along with its operands, flags (such as resource dependencies) and timing information (for setting operational parameters of the physical function unit, such as latencies etc.).

In the illustrated example of FIG. 3, several different types of function units are shown. The function units illustrated include AGUs, ALUs, VMACs, FPMUs, MUs, a VALU, and a VLUT. Sixteen (16) physical XUs are shown labeled XU-0 to XU-15, each with a pair of docks. In the embodiment of FIG. 3, XU-0 has docks labeled ALU-0 and ALU-1. The function units are interconnected via the all-to-all interconnect bus 209, allowing results from the function units to be pushed onto the interconnect bus and to be pulled by any function unit that requires the results.

As described above, use of the interconnect bus 209 implements a form of forwarding/bypassing to increase the instruction-level-parallelism where the result of an instruction on a given function unit can be immediately used by other dependent instructions instead of writing into the register file and waiting for results to be read out one at a time.

The embodiment of FIG. 3 further includes commit engine logic with a commit queue 213. The commit engine 210 provides data to the write ports 216 of the register file. In other words, the read and write ports of the register file may be separated with only the commit engine 210 having direct access to the write ports, thereby further ensuring the in-order commitment as discussed herein. The commit engine is also connected to provide trace program counter information, COF, and data to the dispatcher PC logic, which may be used in debugging.

Figure 4:
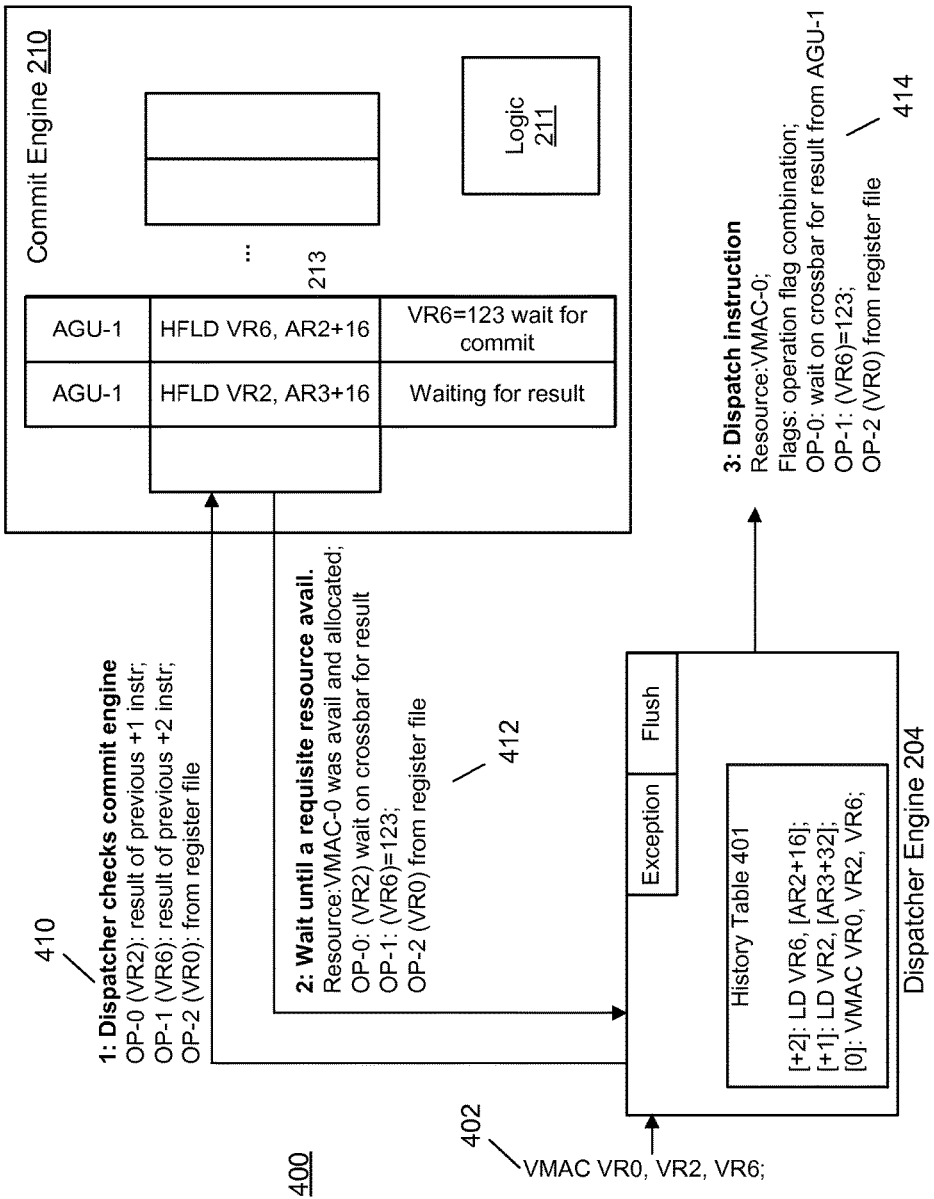
FIG. 4 is a functional block diagram showing instruction flow through a dispatcher engine in accordance with an aspect of the present disclosure.

The operation of the dispatch engine 204 may be better illustrated by referring to a sample sequence of instructions 400 in FIG. 4. Similar reference numerals are used as those in FIG. 2 for convenience.

FIG. 4 is a functional block diagram showing an example instruction flow through the dispatcher engine 204 in accordance with an aspect of the present disclosure. In the example of FIG. 4, a new instruction 402 (VMAC VR0, VR2, VR6) is fetched by the dispatcher engine 204 from the instruction memory (not shown). In this notation, VR0, VR2, and VR6 are the operands of the VMAC instruction. The dispatcher engine 204 then checks the data dependency of the newly fetched instruction 402 by referring to its history table 401. The illustrated history table shows two previous instructions: LD VR6, [AR2+16], indexed as [+1], and LD VR2, [AR3+32], indexed as [+2] in the history table. The [0] instruction is the newly fetched instructions that depends on the results of the two previous instructions [+1] and [+2]. The dispatcher engine 204 determines that the source operand VR2 is the result of the previous (+1) load instruction (LD VR2, [AR3+32]), and operand VR6 is a result of the next previous [+2] load instruction (LD VR6, [AR2+16]). Further, the dispatcher engine 204 determines that the operand VR0 does not depend on any previously dispatched instruction in the history table. The value of VR0 will be loaded from the register file 205.

Logic (not shown) in the dispatcher engine 204 then decodes the instruction (VMAC VR0, VR2, VR6) to determine a type of resource for execution of the instruction. The dispatcher engine 204 then checks with the commit engine 210 for the availability of that type of resource, by issuing a request message 410, which may include, for example, the type of resource and any depending instructions from which the instruction is waiting upon results.

Logic 211 in the commit engine 210 determines from the request message 410 the requested resource. The commit engine logic 211 then determines from its commit queue 213 if the requested resource is available. If, for example, the requested resource is not listed in the commit queue 213, the logic 211 may infer that the requested resource is available, and allocate the available resource, VMAC-0, for this instruction. As described earlier, in order to increase the depth of the pipeline, one physical self-timed clock-less function unit may have several docks (or buffers). Accordingly, the commit engine 210 may allocate an individual dock rather than the entire physical function unit.

The commit engine 210 also looks for results of the depending instructions in its commit queue 213. If the results have been checked into the commit engine queue, the commit engine 210 responds with a message 412 by returning results of the depending instructions (e.g. the value 123 for VR6) and an identification of the allocated resource (VMAC-0) to the dispatcher engine 204; otherwise, if the results are not checked into the commit queue 213, the commit engine 210 returns the resource identifier of the depending instruction (e.g. AGU-1 for VR2).

The dispatcher engine 204 then receives the allocation of the resource (VMAC-0) to which to dispatch the decoded instruction (VMAC VR0, VR2, VR6), the value for the operand VR6, and the resource identifier of the depending instruction for which the value for VR2 will be pulled from the interconnect bus. The dispatcher engine 204 also reads the value of VR0 directly from the register file 205.

Next, before the decoded instruction is dispatched, the dispatcher engine 204 conducts the following operations: 1) registers the fetched instruction (VMAC VR0, VR2, VR6) into the history table 401, 2) signals the commit engine 210 that flags the VMAC-0 as allocated, 3) reads the data from the register file 205, and 4) dispatches the instruction, as shown by reference 414, to the VMAC-0 in the resource pool 208, along with latency information associated with that instruction.

As described earlier, data hazards can arise when an instruction depends on results of one or more previous instructions that are executing. The dispatcher, together with the commit engine, inherently handles these data hazards. In other words, before any instruction is dispatched, the dispatcher engine determines the needed resources and dependent instructions for that instruction as described above. Thus, the dispatcher should maintain a detection depth of at least a maximum of the potential number of instructions in-flight (instructions issued but not committed).

Figure 5:
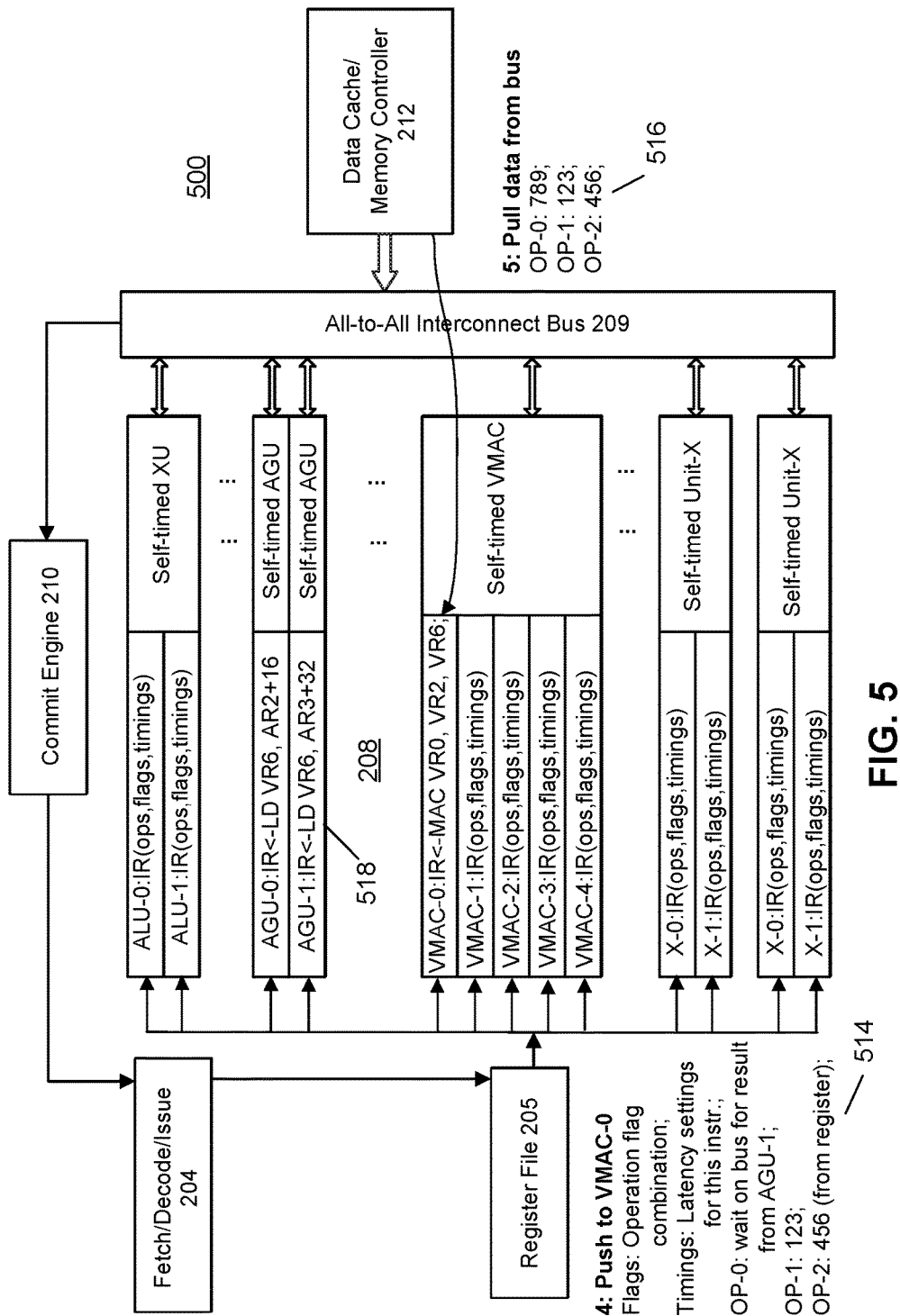
FIG. 5 is a functional block diagram showing instruction flow through self-timed function units in accordance with an aspect of the present disclosure.

Reference is now made to FIG. 5, which shows an example of instruction flow 500 through the resource pool 208 after the instruction is dispatched by the dispatcher engine 204. The instruction flow 500 includes steps that follow on from the steps referenced as 410, 412, and 414 in the example of FIG. 4.

The dispatched instruction from step 414 of FIG. 4 is pushed in step 514 into the VMAC-0 dock or instruction register. The value for VR0 (456 from register file 205) and the value for VR6 (123 from commit engine) were previously obtained. The function unit VMAC then waits, based on the instruction, for the value of VR2 that will appear as a result on the output port of AGU-1 on the interconnect bus 209. In one embodiment, two or more docks, such as VMAC-0 to VMAC-4 that are attached to a single physical function unit VMAC, do not have priority over each other. Rather, any instruction in a dock that collects all required operands will compete for the physical function unit. Once all of operands are available and the physical function unit is available, their availability signals are logically combined to generate an event that triggers a pulse generator for execution of the instruction in the physical function unit.

In the illustrated example, the depending instruction (LD VR2, [AR3+32]) 518 uses AGU-1, which in turn calculates the effective address (AR3+32) and sends it to the memory/cache controller 212. It may take some time for the memory/cache controller 212 to complete the memory reference and send the loaded data (for example 789 in example of FIG. 5) back to the AGU-1. The AGU then outputs the data onto the interconnect bus 209, so that VMAC-0 can pull the data 516 from the bus 209. At this stage, VMAC-0 has collected all of its operands and is ready to execute.

The physical function unit VMAC may also take time to execute the vector MAC operation for the instruction (VMAC VR0, VR2, VR6). It outputs the result (VR0) on the interconnect bus 209. The commit engine 210 continues retrieving any new results from the interconnect bus 209 to the commit queue. Once the commit engine 210 determines that VMAC-0 is finished processing its instructions, the commit engine 210 may immediately flag the VMAC-0 instruction as being available for a newly incoming instruction from the dispatcher engine 204.

Figure 6:
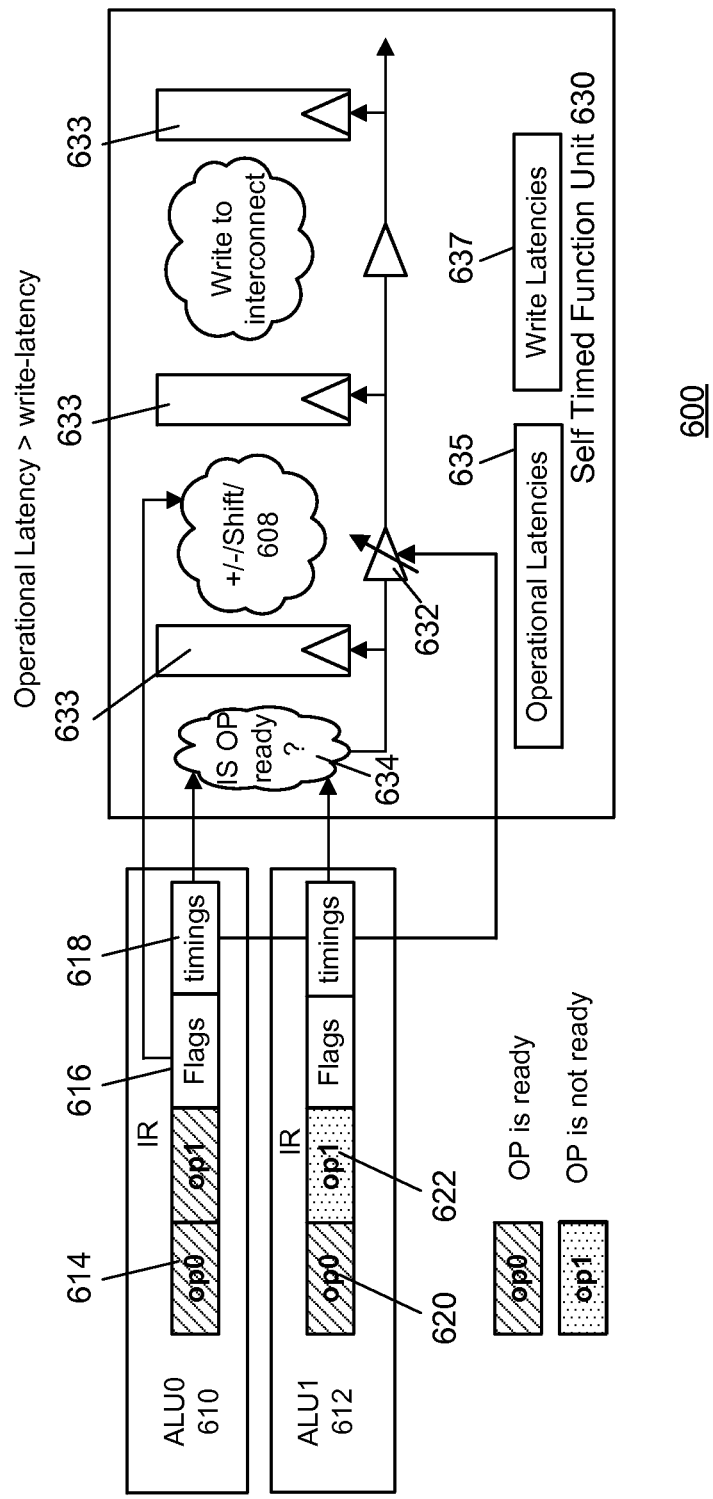
FIG. 6 is a functional block diagram of a one stage self-timed physical function unit in accordance with an aspect of the present disclosure.

Reference is now made to FIG. 6, which provides further detail on the physical structure of an example one-stage ALU function unit 600. The ALU function unit 600 includes two instruction registers 610 and 612.

The instruction registers may each be broken into fields for operands, flags and timings, as shown by blocks 614, 616 and 618 in instruction register 610. Each instruction register may store an indication of whether the operands are ready. Thus, in the example of FIG. 6, operand 620 in instruction register 612 is ready, while operand 622 in the same instruction register is not ready.

Within each instruction register, the operand flags are used to configure a combination circuit. The timing information is used to set up an operational latency. When the OP is ready to transfer an instruction in an IR into the function unit, a ready signal pulse is triggered. This signal pulse is delayed by the timing information read from the timing field of this instruction. The delayed signal pulse continues at the end of the operational latency delay to trigger a write of the result to the interconnect bus operation. The result is written to the interconnect bus after the write-latency, which is fixed and configured at the initialization stage of the processor. A ready signal is delayed by the write latency and triggers the next ready instruction in one of the IRs.

An example physical function unit 630 is similar to that described above with respect to FIG. 1A and includes an asynchronous logic block 608 providing various functions such as shift, add, multiply etc. which may be selected by a value in the flags field 616. The physical function unit 630 also includes an associated self-clocked generator block (not shown) with variable timing element 632, and data storage elements or latches (or flip-flops or registers) 633. The variable timing element 632 may be programmed by the delay value in the timing field 618.

The self-clocked generator delay may be programmed, by the delay of the variable timing element 632, to output a clock signal after a predetermined time period within an operational latencies block 635 (dependent on the instruction to be executed) from receipt of a trigger signal. For example, the trigger signal may be generated by an operation ready block 634, such as the event logic block 113 described in FIG. 1A above.

The execution result may be latched and then output to the interconnect bus after a predetermined write latency 637.

Figure 7:
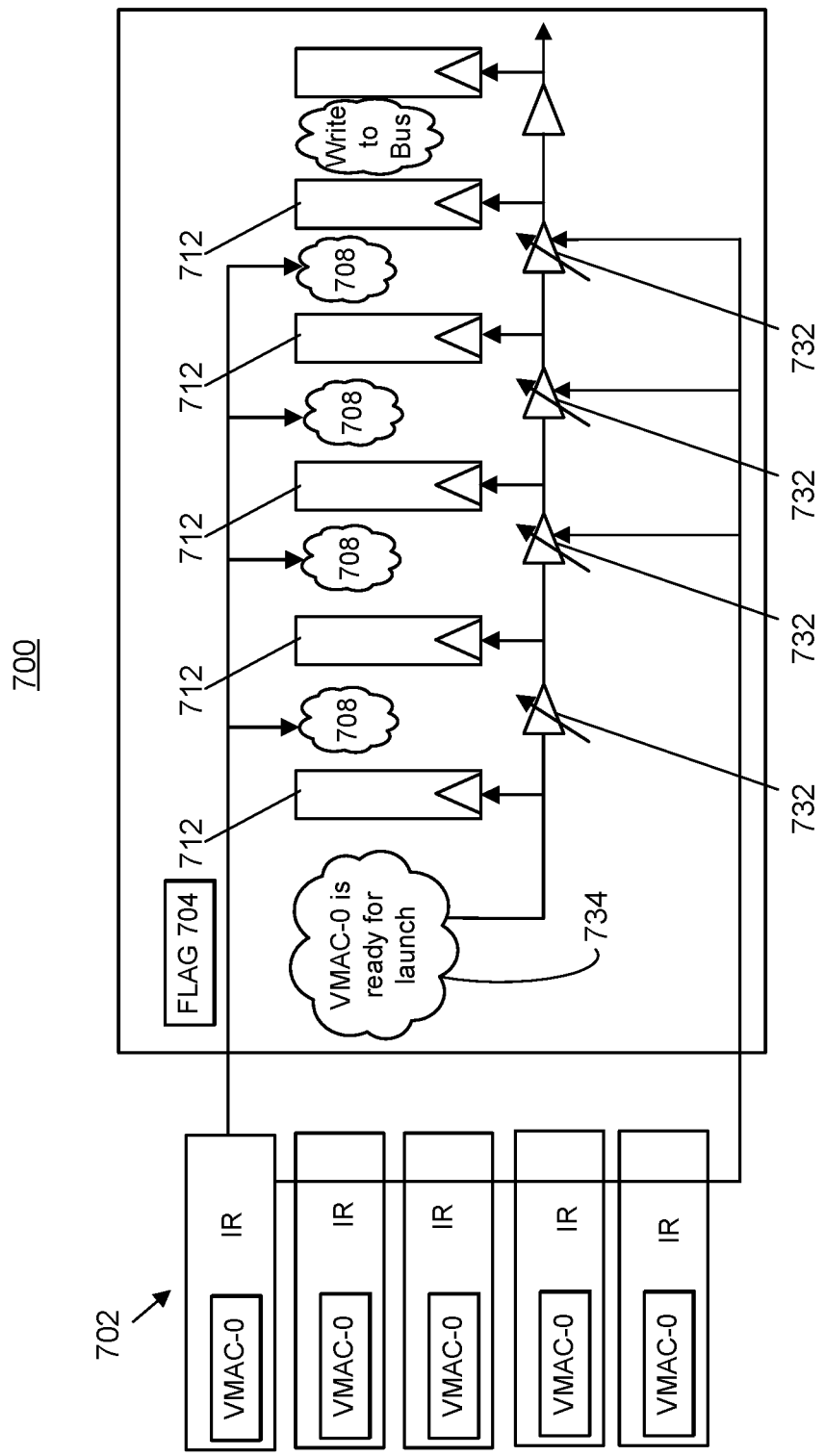
FIG. 7 is a functional block diagram of a multi-stage self-timed physical function unit in accordance with an aspect of the present disclosure.

In the example of FIG. 6, two IRs (docks) are attached to this function unit. If the physical unit supports multiple stages (e.g. for a more complicated operation), more docks may be added to maintain a higher utilization of the physical unit, as for example illustrated by the function unit 700 in FIG. 7. The example function unit 700 includes multiple stages, each similar to the one-stage self-timed function unit 630 described with regard to FIG. 6 above.

The function unit 700 includes multiple docks 702, and multiple asynchronous logic blocks 708, each providing the various functions such as shift, add, multiply etc. selected by a flag 704 obtained from the flags field of a selected dock 702. The function unit 700 illustrates a four-stage VMAC implementation, with five instruction registers. Each logic block 708 has an associated self-clocked generator block (not shown) with variable timing elements 732, and data storage elements or latches (or flip-flops or registers) 712. The operation of the four stage VMAC is explained below.

The variable timing elements 732 may be programmed by the delay value in the timing field of the selected dock 702. The self-clocked generators each generate a respective delay with their respective variable timing element. Thus, each self-clocked generator may be programmed to output a clock signal after a predetermined time period, dependent on the instruction to be executed, from receipt of a trigger signal as previously described.

For example, the trigger signal may be generated by an operation ready block 734, such as the event logic block 113 described in FIG. 1A above. The execution result may be latched and then output to the interconnect bus after a predetermined write latency 737. As may be seen from FIG. 7, an instruction in one dock may begin execution before a currently executing instruction in another dock has completed, thus achieving pipelining in this multistage function unit 700.

Figure 8:
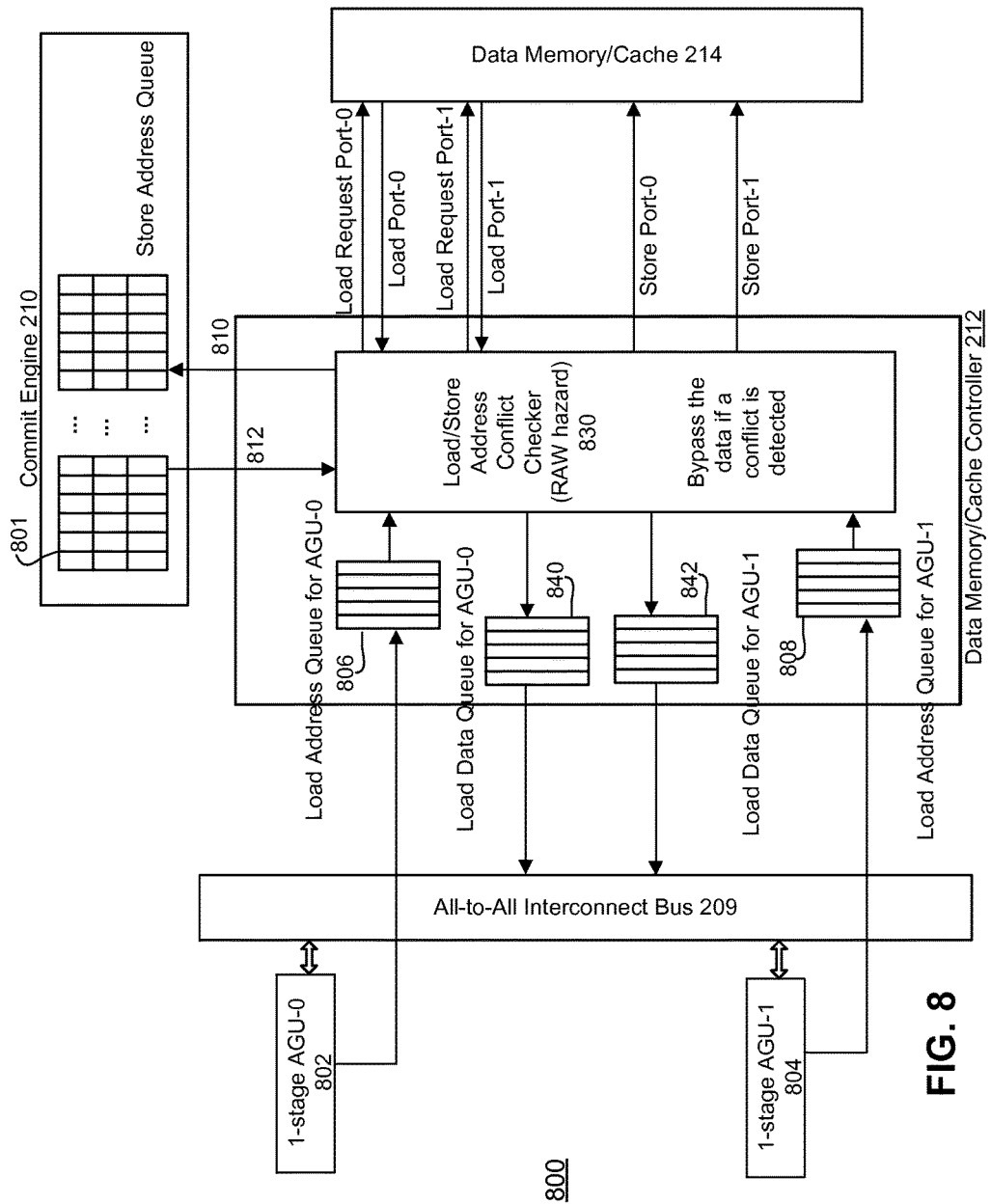
FIG. 8 is a functional block diagram of a memory cache controller in accordance with an aspect of the present disclosure.

Referring to FIG. 8, there is shown a block diagram 800 of the memory/cache controller 212 and data memory/cache 214 along with two AGUs (address-generator-units), namely AGU-0 802, and AGU-1 804. The data cache/memory 214 is illustrated as having multiple read and write ports. The operation of the data memory/cache controller may be explained in conjunction with a usage scenario. If it is assumed that AGU-0 802 and AGU-1 804 compete for one reading port or writing port of the memory 214, a structural hazard may ensue. The memory may also be of the type having a common read/write port, but typically separate read and write port memories are used.

To avoid a structural hazard, the memory controller 212 may be configured with sufficient read and write ports for each of the many AGUs. In addition, even though an AGU calculates an effective address for both loading and storing of data, the effective address for the loading of data is not output to the data memory/cache 214 directly, but output to the data memory/cache controller 212 instead.

The loading address is first pushed into a load address queue 806 in the memory controller 212. The load address queues may be implemented as FIFO queues, such that loading of data within a queue may be in-order. If there are many AGUs, the AGUs 802, 804 each have a dedicated AGU loading queue 806, 808, respectively. One loading queue among the different AGU loading queues 806, 808 has no priority over another. This implies that while the loading within a given queue may be in-order, the loading priority, for a given loading queue, among different AGU loading queues 806, 808 may be out-of-order.

Every loading address is checked with commit engine 810 to determine if it conflicts with any pending storing address in the commit engine queue. Therefore, the storing subfield (EA) of the commit engine queue 801 is visible to the data memory/cache controller 812. Such checking is done by conflict checker 830.

If there is no conflict, the data memory/cache controller 212 issues a memory reference to the data memory/cache 214; otherwise, data memory/cache controller 212 suspends the loading address until the conflict is resolved, for example, the pending storing is issued to the memory and moves to the next loading address.

The loaded data is tagged with the AGU identification (AGU-ID) and pushed into the received queue specific for this AGU. Some example queues 840 and 842 are shown. Finally, the loaded data is output onto the interconnect bus 209.

Storing operations may occur differently to the loading as described above. For storing, the commit engine pulls the address value 810 into the commit queue 801, and stores it in an effective address (EA) subfield associated with that AGU, as described later with reference to FIG. 9 below. The commit engine also stores the data in data sub-field in the commit queue (see FIG. 9 below) rather than in the memory controller 212. In effect, the commit queue 801 also functions as a storing queue.

The commit engine 210 generates a storing reference signal 812, including a value and a storing address, to be processed by the memory controller. Such signal should be configured to trigger with a higher priority than other trigger signals. Meanwhile, the commit engine 210 will release the loading addresses if they are blocked by this storing address. In other words, if a load of data from the load address was attempted before a write of data to that address, the potential data hazard is avoided by restricting data loads until the data to be loaded has been stored. Furthermore, if a memory address conflict is detected, the memory controller can directly output the stored value from that address back to the AGU queue in the memory controller.

Details of the commit engine 210 are provided below. The commit engine is the resource manager of the processor 100. The commit engine performs various functions, which include but are not limited to: pulling results from the interconnect bus 209; reordering the commitment of instructions; acting as a storing queue; handling flushes, exceptions, and interrupts; functioning as a temporal register file that saves the results to be committed; maintaining the PC of an instruction to be committed; and being responsible for revoking incorrect speculative instructions.

Figure 9:
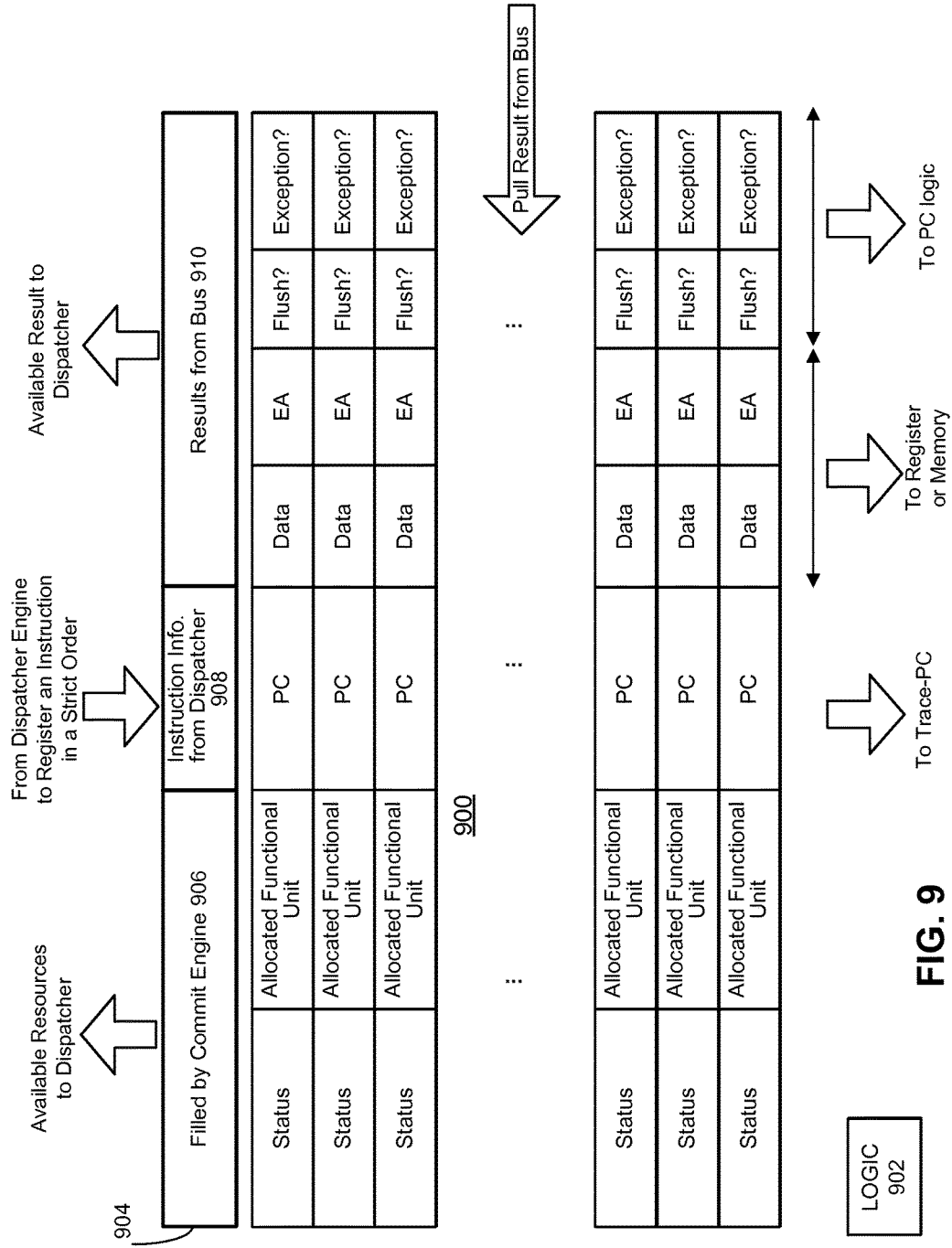
FIG. 9 is a schematic diagram of a commit engine queue in accordance with aspect of the present disclosure.

Referring to FIG. 9 there is shown schematically an instance of the commit engine. The commit engine logic 902 is built around a FIFO queue 900 that includes several fields and maintains an order of the instructions in their original sequence (PC) from the instruction memory (dispatcher).

An entry 904 in the FIFO queue is firstly created by the commit engine logic 902 for every new instruction to be dispatched, as described above. The commit engine logic retires entries when committed. Commitment of an instruction may include one or more of: writing data or an address into the register file; writing data to memory; jumping to a target address indicated by the PC; or a raising an exception.

Entries in the FIFO queue are updated by the commit engine based in part on signals from the dispatcher engine, the memory/cache controller, and results from the interconnect bus. In the illustrated embodiment of FIG. 9, the queue in the commit engine is a FIFO register having three fields. However, more or fewer fields may be implemented in other embodiments, and the present disclosure is not limited to any number of fields. In the embodiment of FIG. 9, the fields correspond to: information filled by the commit engine 906; instruction information from the dispatcher 908; and results from the interconnect bus 910.

The information field 906 filled by the commit engine includes subfields for a status of a function unit, and for an identification of an allocated function unit. The dispatcher field 908 has a PC subfield. The results from the interconnect bus field 910 have data, EA (effective address), flush status, and exception status subfields.

To illustrate operation of the commit engine 210, an example processing of an instruction stream is provided below. When the dispatcher engine 204 fetches an instruction from the instruction memory 202, it firstly sends an allocation request to the commit engine. As provided above, this request may contain several fields including: the type of the resource required by the instruction; and source operands.

As a resource manager, the commit engine logic 902 checks the availability of the requested resource, and grants the requested resource, if available, to the instruction by creating an entry, in the status and allocated function unit subfields, at the tail of the FIFO queue.

If a requested resource is not available, commit engine logic 902 will block the dispatcher engine (or inform the dispatcher to stall the pipeline) until the requested resource is available.

Once an entry is created for a new instruction, and a requested resource is allocated to that new instruction, commit engine logic 902 determines, for all source operands of the new instruction, the depending instructions for the new instruction, and the data field of the depending instructions, in a manner described above in FIG. 4. If a depending instruction has a result that is ready, as indicated by the data subfield containing a data value, commit engine logic 902 feeds back the value in the data subfield to the dispatcher engine. If the data sub field is not ready, in other words no data value is present, the commit engine logic 902 feeds back the allocated function unit identifier (described above as the depending resources) of this operand to the dispatcher engine as described above with reference to FIG. 4. In one embodiment, the operands will be read from the interconnect bus.

If the depending instruction is not found in the queue and the depending instruction has already been committed, then the commit engine feeds back the "read-from-register-file" signals of this operand to the dispatcher engine informing the dispatcher engine that the operands should be read from the register file.

Once the dispatcher engine 204 receives this feedback from the commit engine, it may dispatch the instruction to the corresponding resource, as provided above. Once an instruction has been successfully dispatched; the dispatch engine will then signal a value of the PC of the dispatched instruction to the commit engine. The commit engine 210 will update the PC-field subfield with the new entry. This may be used later for a PC trace.

During such dispatcher engine 204 actions, the commit engine logic 902 continues monitoring and pulling the results from the interconnect bus. For example, the commit engine logic 902 continues monitoring the interconnect bus for data results, effective addresses (storing), flush requests, or exceptions.

For example, for a calculation instruction the commit engine logic 902, will pull a data result and add it into the data field of an entry for the allocated function unit. When this entry moves to the head of the queue, the data is written to the write port 216 of the register file 205.

For a storing instruction, the commit engine logic 902 provides that the effective address is pulled and added to the EA-field of an entry for the allocated function unit. Further, to-be-stored data is pulled and added into the data field of an entry for the allocated function unit. When the entry moves to the head of the queue, the storing requests, which may include data and address, are issued to the memory controller. As described above, the data and ED subfields are exposed to the memory controller for load-store-address-conflict checking. In other words, these subfields may be directly accessed and changed by the memory controller.

For a COF instruction such as a branch, the commit engine logic 902 is provided with a signal from the interconnect bus as to whether or not a branch is to be taken. Since the commit engine has access to the speculation logic included in the PC logic in the dispatcher engine, it can fill the flush subfield. If a flush is positive, the commit engine can choose to either revoke all the instructions after this COF instruction or wait until the COF moves to the head of the queue. In other words, if a speculative branch is not taken by the processor, speculative instructions in the speculative branch, which would have be entered into the commit FIFO queue, may be actively revoked when this branch is not taken. Otherwise, the commit engine may simply let these speculative instructions progress out the FIFO queue until they are retired as a normal consequence of reaching the head of the queue.

Thus, speculation is implemented in the dispatcher engine. An incoming instruction is pre-decoded to determine if it is a branch instruction. If it is a branch instruction, the speculation logic will guess if this branch is taken or not based on the built-in updated score table. Based on the guess result, the logic is directly instructed to fetch the next PC instruction, which in some cases may be an offset.

After the commit-engine 902 commits the branch instruction, it feeds COF information back to the speculation logic in the dispatcher where, based on the previous guess, the speculation logic in the dispatcher determines whether the guess was correct or incorrect. If correct, the speculation logic in the dispatcher increases its score, which is a value indicative of an overall accuracy of the speculation, as is well known in the art. Thus, future speculations of the result of the same branch instruction are more likely to predict the same outcome. If wrong, the speculation logic in the dispatcher decreases its score. Thus, future speculations of the result of the same branch instruction are less likely to predict the same outcome.

Figure 10:
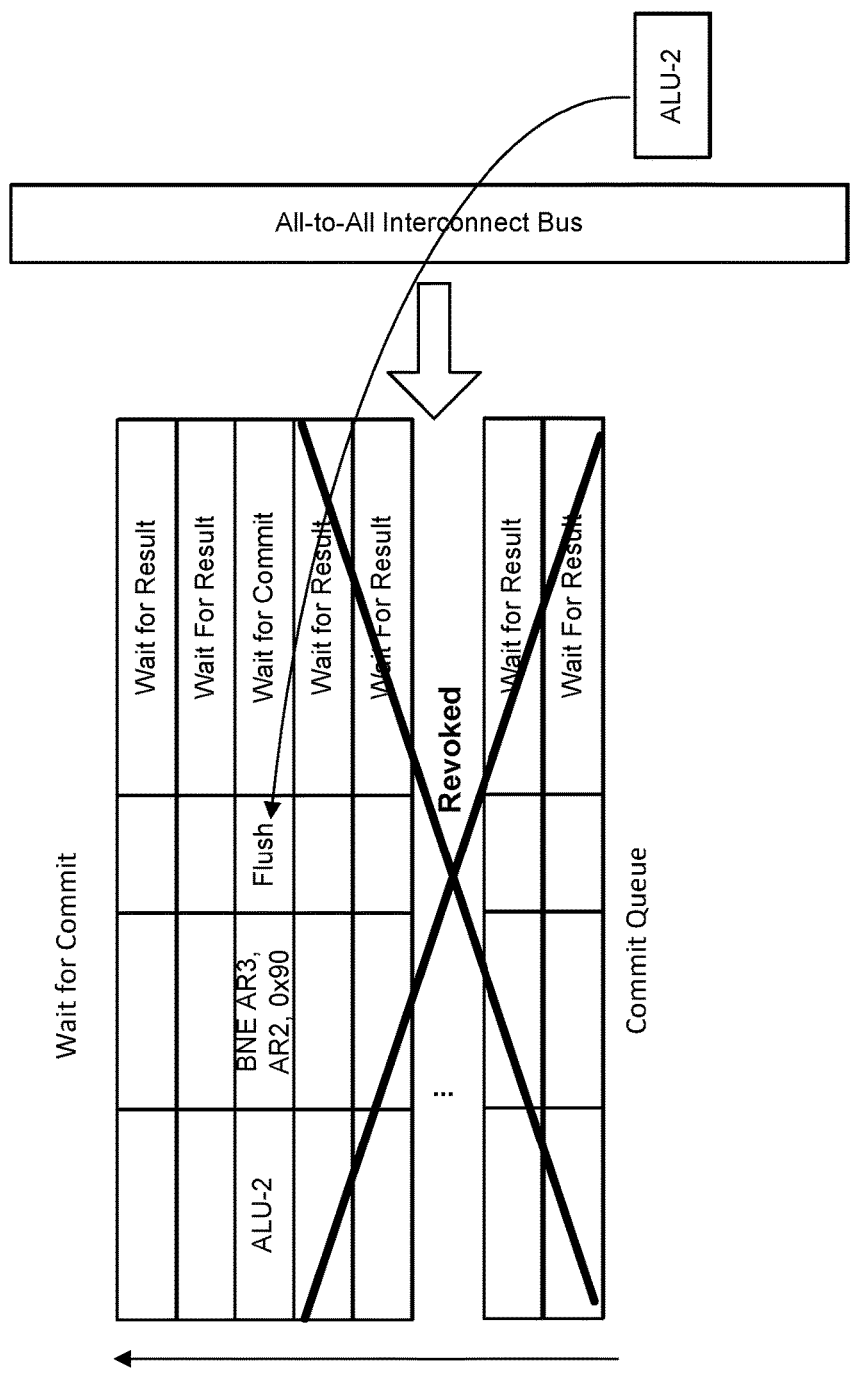
FIG. 10 is a schematic diagram of a flush operation in accordance with an aspect of the present disclosure.

Referring to FIG. 10, there is shown conceptually an example flush operation. In out-of-order execution, a COF is regarded as a type of instruction result that is passed to the commit engine through the interconnect bus. Once the commit engine receives a COF result from an instruction, it may revoke all of the instructions dispatched later than the instruction that produced the COF result. In other words, the commit engine may treat the COF as an exception and the commit engine may revoke any instructions behind the COF instruction in the queue if the instructions were in the not taken branch.

As illustrated in FIG. 10, ALU-2 has been allocated in the commit queue to execute an instruction [BNE AR3, AR2, 0x90]. Execution of this instruction in ALU-2 leads to a COF. However, because this instruction is not at the head of the commit queue, the instruction has to wait for the commitment of its preceding two instructions. If it is later determined that there is a COF instruction before this instruction, then this instruction is revoked as being the result of an incorrect speculation.

Similarly to the COF above, an exception raised from the interconnect bus will result in a flag being set in the exception subfield of the commit queue. If an exception is thrown, the commit engine logic can choose to either revoke all the instructions after this exception instruction or wait until this exception moves to the head of the queue. The effect of the revocation is to delete instructions from the queue and flag resources previously allocated to the deleted instructions as being available again.

In the processor of the present disclosure, exceptions are thrown by allocated function units, the memory/cache controller, or the dispatcher engine, due to, for example, an illegal opcode. These exceptions are all routed to the commit engine where they are captured in the commit queue and associated to an instruction in the queue. The exceptions which are thrown by the allocated function units and the memory/cache controller are routed via the interconnect bus to the commit engine to be processed as an either exceptions or flushes. Exceptions from the dispatcher engine are routed to the commit engine to stall the pipeline.

Figure 11:
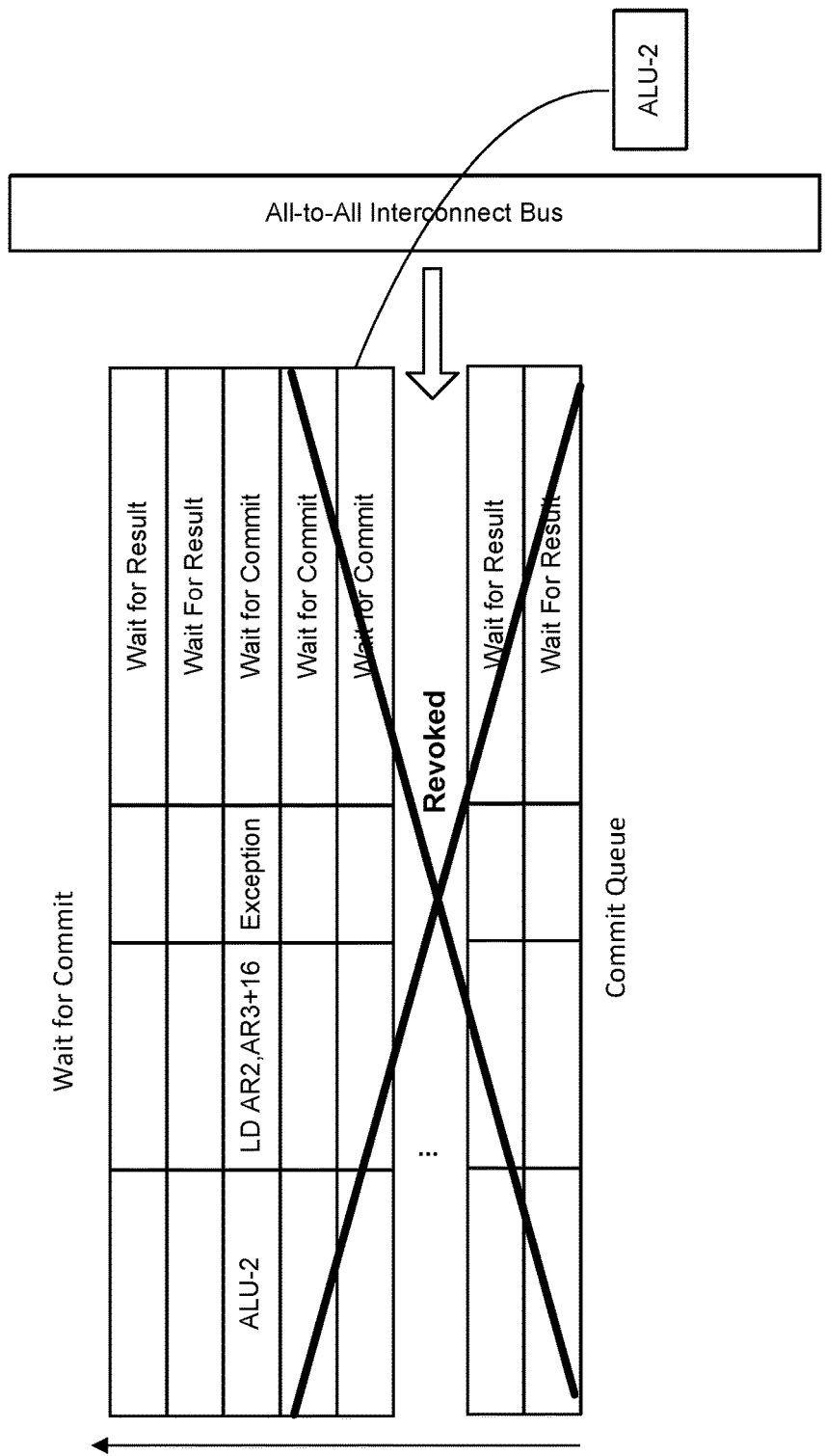
FIG. 11 is a schematic diagram of an exception operation in accordance with an aspect of the present disclosure.

As illustrated in FIG. 11, ALU-2 executes instruction [LD AR2, AR3+16]. This instruction generates an "ineffective address" exception signal. This exception is not raised to the dispatcher until the instruction moves to the head of the commit queue. If there is any COF instruction precedent to the instruction [LD AR2, AR3+16], the execution of the instruction would be speculative. In other words, the instruction is in a sequence of speculative instructions, and therefore no exception ought to be raised. The exception is thus precisely handled.

Figure 12:
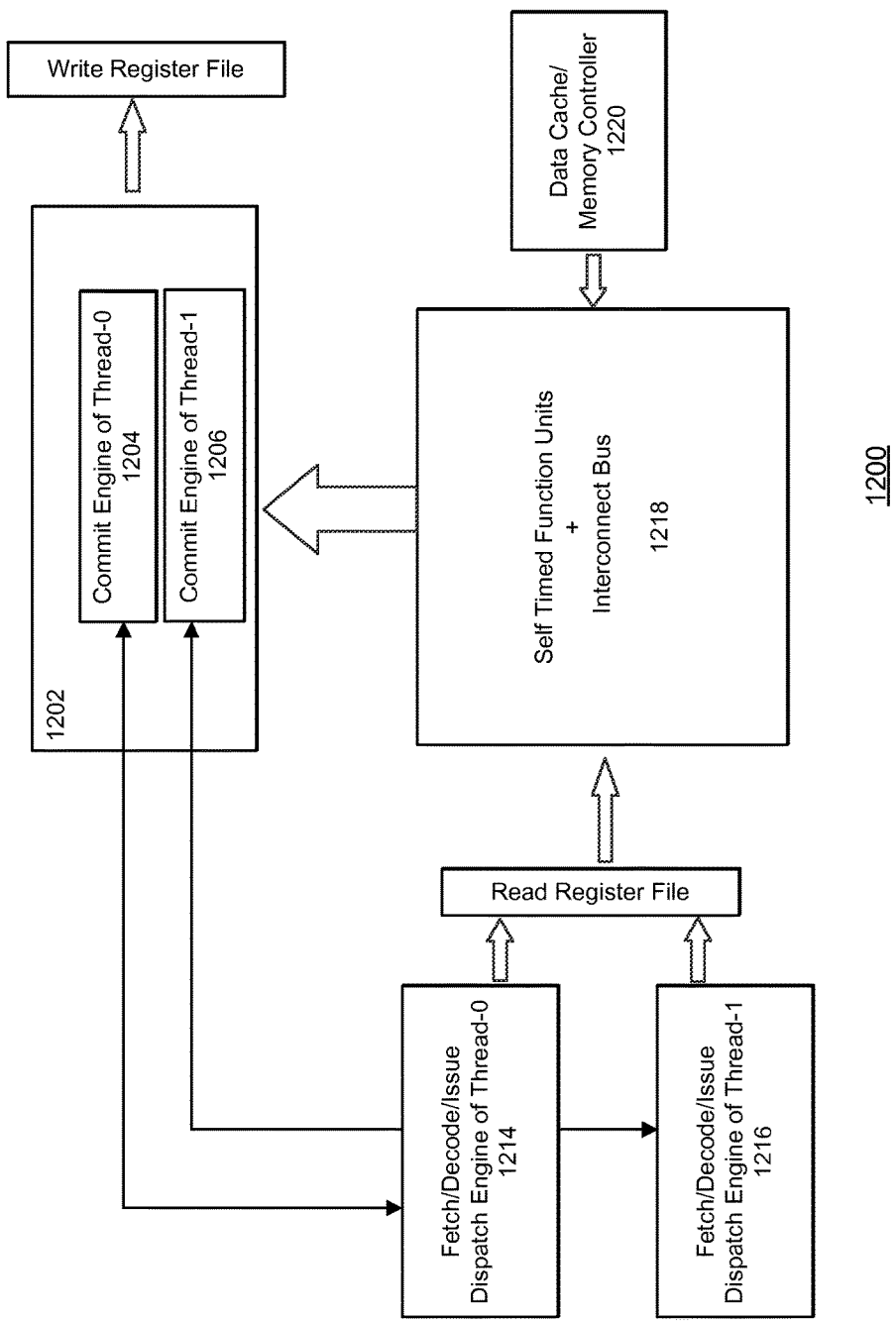
FIG. 12 is a block diagram of an simultaneous multi-threading (SMT) architecture in accordance with an aspect of the present disclosure.

Referring now to FIG. 12, there is shown a schematic diagram 1200 of out-of-order simultaneous multi-threading (MT). Simultaneous MT (SMT) is a technique for improving the overall efficiency of superscalar processors with hardware multithreading. SMT permits multiple independent threads of execution to better utilize the resources provided.

In the embodiment of FIG. 12, multiple commit engines 1204, 1206 are configured, each corresponding to a unique thread. A thread may be defined as a sequence of program instructions that can be managed independently.

For each thread, a separate dispatch engine 1214, 1216, is implemented. The respective dispatch engine 1214, 1216 communicates with its corresponding commit engine 1204, 1206 in the logical commit engine 1202 and registers its instructions with the appropriate commit engine queues in a manner as described above with regard to the single thread implementation.

The respective dispatch engines 1214, 1216 issue instructions for their threads to the shared pool of self-timed function units 1218. Thus the resource pool 1218 can receive multiple instructions from multiple threads. From the resource pool perspective SMT implementation of FIG. 12 is no different than a single thread implementation described above.

In FIG. 12, the two dispatch engines 1214, 1216 work independently, with the two commit engines 1204, 1206 working independently but sharing the information about resources and sharing the resource pool 1218. As seen in FIG. 12, one dispatch engine 1204 is coupled to one dedicated commit-engine 1214 in one independent thread-context (Thread-0).

Each dispatch engine may contain its own branch predictor table (BTB) and scoreboard that records the dispatched instructions. Each commit engine 1204, 1206 contains a dedicated queue for each single thread, as described above.

Accordingly, the data memory/cache 1220 is able to send two instructions for two PC requests to the dispatch engines 1214, 1216 respectively. The data memory/cache 1220 can handle a case where both threads make a request to offset their PCs simultaneously. A consequence may be, for example, that if one thread is stalled and ceases requesting instructions, the other thread, if not stalled, may use the entire instruction bandwidth.

Figure 13:
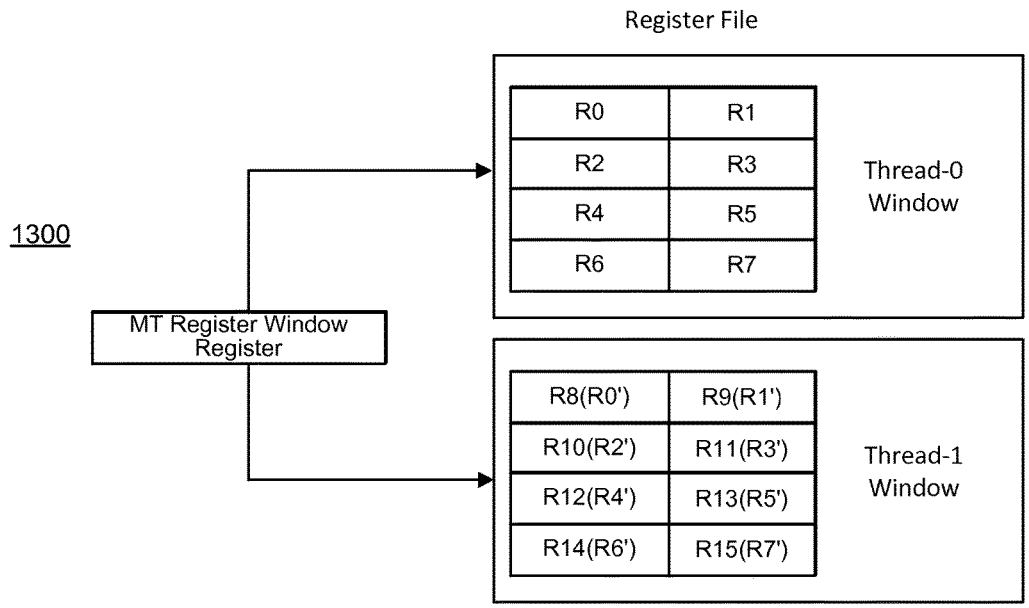
FIG. 13 is a graphical representation a thread-register window diagram for the SMT architecture of FIG. 12, in accordance with an aspect of the present disclosure.
Figure 14:
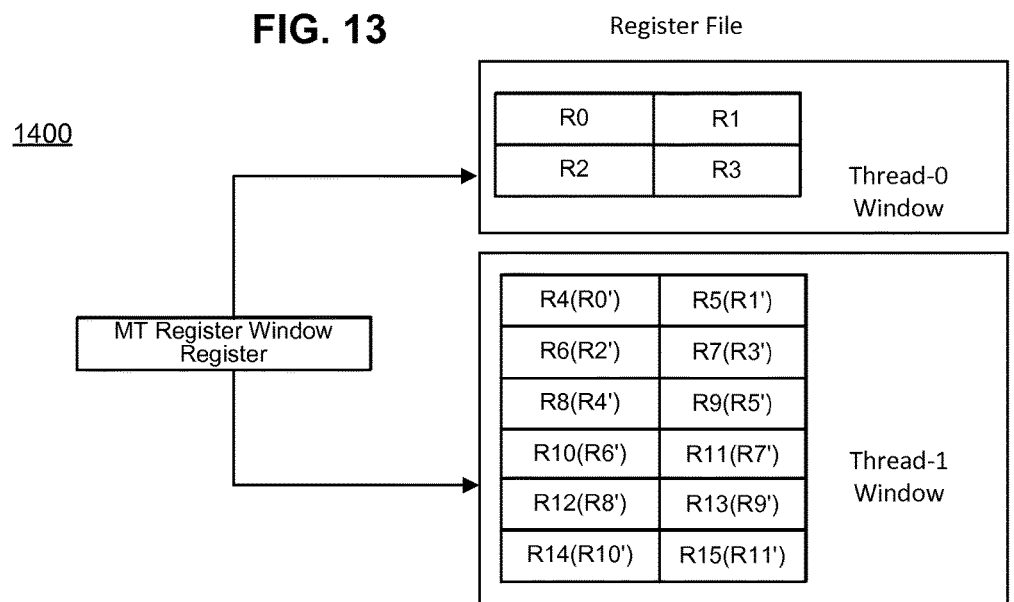
FIG. 14 is a graphical representation another thread-register window diagram for the SMT architecture of FIG. 12, in accordance with another aspect of the present disclosure.

Each thread has an independent register file. FIGS. 13 and 14 graphically illustrate MT register windows 1300, 1400 respectively, which graphically illustrate how individual registers are allocated to threads from a register file.

In FIG. 13 there is shown an example of two threads equally sharing a number of register files. In other words, the register files are allocated in equal numbers to each thread.

FIG. 14 shows an example of two threads unequally sharing a register file. As illustrated in FIG. 14, Thread-0 has a fewer number of register files than Thread-1.

Figure 15:
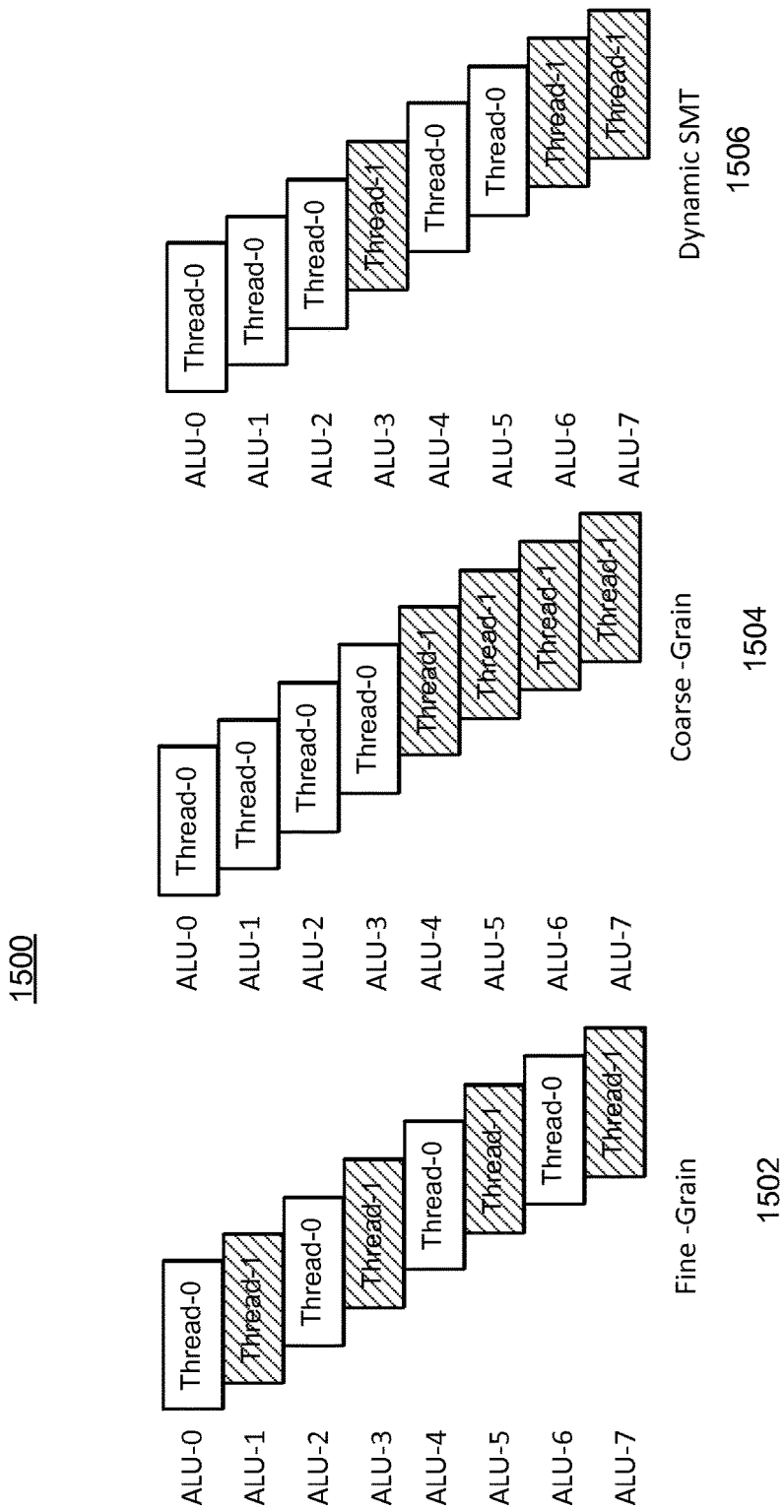
FIG. 15 is a graphical representation of different levels of scheduling for the SMT architecture of FIG. 12, in accordance with another aspect of the present disclosure.

FIG. 15 shows various levels of scheduling of resources. For example, in fine grain scheduling 1502, each thread is alternatively allocated resources. In coarse grain scheduling 1504, one thread may be allocated a number of contiguous resources, before the other thread is allocated resources. In dynamic scheduling 1506, one thread may be allocated in non-contiguous resources depending on the dynamics of instruction-flow density.

A MT controller dynamically feeds instructions to the function units among the multiple threads based on an instantaneous instruction-flow density or on the traffic of each thread. For example, different scheduling algorithms can be implemented for different applications.

If, for example, two threads are equally important for an application, then their instruction-flow density may generally be similar to each other. Conversely, if one thread is more critical than the other, the MT controller may allocate more resources (e.g. ALUs) for the critical thread while maintaining an acceptable instruction-flow density for the less important thread.

The processors according to embodiments of the present disclosure remove a need for a global clock tree. The avoidance of deploying a global clock tree can save, for example, up to 30% of power of a processor. More importantly, as the number of cores increases, a global clock tree becomes more difficult to implement given the limitations on the processor die. Further, as the number of coresincrease, heat reduction becomes a more important consideration. Reducing the amount of power consumed globally and by each resource can help address these concerns.

Still further, a software application may not be able to use all of the resources of a processor. Thus unneeded resources are not unnecessarily enabled. The use of a global clock tree means that unused resources may be clocked, further contributing to power inefficiency.

Those of skill in the art would understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Figure 16:
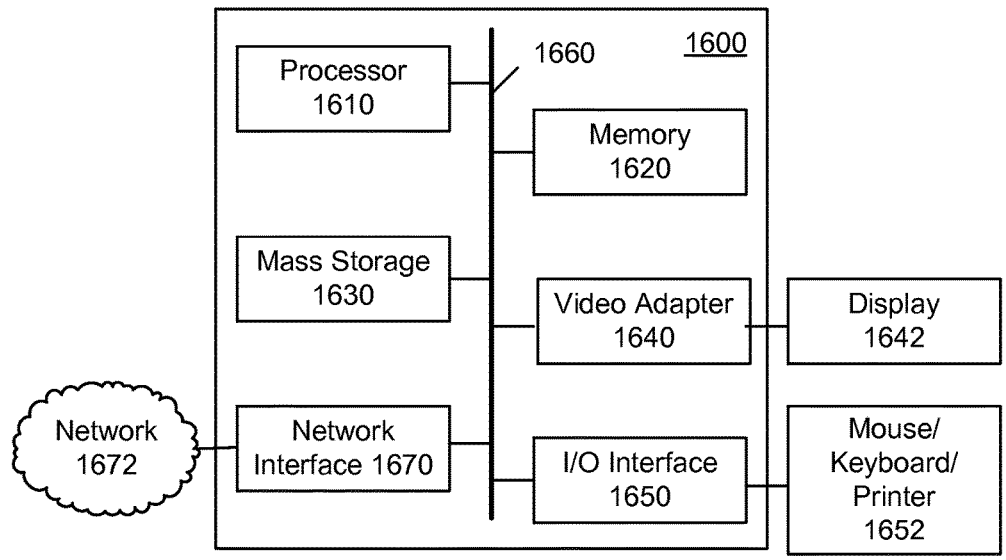
FIG. 16 is a block diagram of an embodiment of a processing system.

The methods, devices and systems described herein may be used in or with any computing system or device including but not limited to user equipments, mobile devices, node Bs, base stations, network elements, transmission points, machines, chips, etc. For example, FIG. 16 is a block diagram of a processing system 1600 that may be used with the methods and devices according to the present disclosure. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1600 may comprise a processing unit equipped with one or more input/output devices, such as a speaker, microphone, mouse, touchscreen, keypad, keyboard, printer, display, and the like. The processing system may include one or more of a processor 1610, memory 1620, a mass storage device 1630, a video adapter 1640, and an I/O interface 1250 connected to a bus 1660. In at least one embodiment, processor 1610 may be multi-core or a many-core processor, or any other processor having multiple execution units, for example for executing one or more methods according to the present disclosure.

The bus 1660 may be one or more of any type of several bus architectures including a memory bus or memory controller, a peripheral bus, video bus, or the like. The memory 1620 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1630 may comprise any type of storage device configured to store data, programs, and other information and to make the data, programs, and other information accessible via the bus. The mass storage device 1630 may comprise, for example, one or more of a solid state drive, hard disk drive, a magnetic disk drive, an optical disk drive, or the like.

The video adapter 1640 and the I/O interface 1650 provide interfaces to couple external input and output devices to the processing system. As illustrated, examples of input and output devices include the display 1642 coupled to the video adapter and the mouse/keyboard/printer 1652 coupled to the I/O interface. Other devices may be coupled to the processing system, and additional or fewer interface cards may be utilized. For example, a serial interface such as Universal Serial Bus (USB) (not shown) may be used to provide an interface for a printer.

The processing system 1600 also includes one or more network interfaces 1670, which may comprise wired links, such as an Ethernet cable or the like, and/or wireless links to access nodes or different networks. The network interface 1670 may allow the processing system to communicate with remote units or systems via the networks. For example, the network interface 1670 may provide wireless communication via one or more transmitters/transmit antennas and one or more receivers/receive antennas. In an embodiment, the processing system 1600 may be coupled to a local-area network or a wide-area network, shown as network 1672, for data processing and communications with remote devices, such as other processing systems, the Internet, remote storage facilities, or the like.

Figure 17:
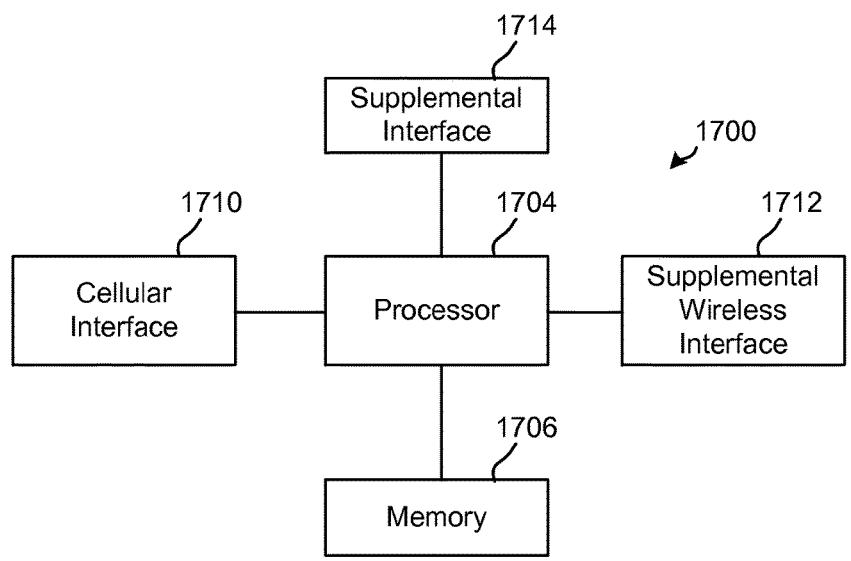
FIG. 17 is a block diagram of an embodiment of a communications device.

FIG. 17 illustrates a block diagram of an embodiment of a communications device or system 1700, which may be equivalent to one or more devices (e.g., user equipments, node Bs, base stations, network elements, transmission points, machines, chips, etc.) discussed above. The communications device 1700 may include one or more processors 1704, such as for example a multi-core or a many-core processor. Communications device 1700 may further include a memory 1706, a cellular interface 1710, a supplemental wireless interface 1712, and a supplemental interface 1714, which may (or may not) be arranged as shown in FIG. 17. The processor 1704 may be any component capable of performing computations and/or other processing related tasks, and the memory 1706 may be any component capable of storing programming and/or instructions for the processor 1704. The cellular interface 1710 may be any component or collection of components that allows the communications device 1700 to communicate using a cellular signal, and may be used to receive and/or transmit information over a cellular connection of a cellular network. The supplemental wireless interface 1712 may be any component or collection of components that allows the communications device 1700 to communicate via a non-cellular wireless protocol, such as a Wi-Fi or Bluetooth protocol, or a control protocol. The device 1700 may use the cellular interface 1710 and/or the supplemental wireless interface 1712 to communicate with any wirelessly enabled component, e.g., a base station, relay, mobile device, etc. The supplemental interface 1714 may be any component or collection of components that allows the communications device 1700 to communicate via a supplemental protocol, including wire-line protocols. In embodiments, the supplemental interface 1714 may allow the device 1700 to communicate with another component, such as a backhaul network component.

Through the descriptions of the preceding embodiments, the teachings of the present disclosure may be implemented by using hardware only or by using a combination of software and hardware. Software or other computer executable instructions for implementing one or more embodiments, or one or more portions thereof, may be stored on any suitable computer readable storage medium. The computer readable storage medium may be a tangible or in transitory/non-transitory medium such as optical (e.g., CD, DVD, Blu-Ray, etc.), magnetic, hard disk, volatile or non-volatile, solid state, or any other type of storage medium known in the art.

Additional features and advantages of the present disclosure will be appreciated by those skilled in the art.

The structure, features, accessories, and alternatives of specific embodiments described herein and shown in the figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

The techniques described herein may be used for the wireless networks and radio access technologies, as well as other wireless networks and radio access technologies. The present disclosure is not limited to any particular wireless technology or standard Moreover, the previous detailed description is provided to enable any person skilled in the art to make or use one or more embodiments according to the present disclosure. Various modifications to those embodiments will be readily apparent to those skilled in the art, and the generic principles defined herein may be applied to other embodiments without departing from the spirit or scope of the teachings provided herein. Thus, the present methods, systems, and or devices are not intended to be limited to the embodiments disclosed herein. The scope of the claims should not be limited by these embodiments, but should be given the broadest interpretation consistent with the description as a whole. Reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

Furthermore, nothing herein is intended as an admission of prior art or of common general knowledge. Furthermore, citation or identification of any document in this application is not an admission that such document is available as prior art, or that any reference forms a part of the common general knowledge in the art. Moreover, nothing disclosed herein is intended to be dedicated to the public regardless of whether such disclosure is explicitly recited in the claims.

The invention claimed is:

1. A processor comprising:
a plurality of parallel self-timed function units;
an instruction dispatcher configured to dispatch one or more instructions to one or more of the function units in a program counter order, the instruction dispatcher further configured to tag at least one of the one or more instructions with a dependent function unit identifier configured to identify a particular function unit for execution of a subsequent instruction; and
a plurality of event logic circuits, each of the plurality of event logic circuits being associated with a function unit of the plurality of function units, each event logic circuit being configured to trigger operation of the function unit to generate an instruction execution result in response to receiving, at the function unit, a dispatched instruction;
wherein at least one of the execution results is generated in an order different from the program counter order, and
wherein the execution result generated by the instruction tagged with the dependent function unit identifier is used as an operand by the particular function unit identified by the dependent function unit identifier in execution of the subsequent instruction.

2. The processor of claim 1, wherein the function units are interconnected to share the execution results.

3. The processor of claim 2, including a data memory controller connected to read the execution results; and a plurality of load address FIFO queues each assigned to respective address generation function units.

4. The processor of claim 3, wherein the data memory controller is further configured to check if every load address conflicts with a pending store address.

5. The processor of claim 3, wherein a resource manager triggers a store address to the memory controller.

6. The processor of claim 1, wherein the instruction dispatcher is further configured to:
fetch instructions in program counter order; and
determine a target function unit for execution of a fetched instruction.

7. The processor of claim 1, further including a resource manager configured to:
monitor function units; and
determine availability of target function units.

8. The processor of claim 7, wherein the resource manager is connected to control commitment of execution results.

9. The processor of claim 8, wherein the resource manager is self-clocked.

10. The processor of claim 7, wherein the instruction dispatcher is further configured to:
request, from the resource manager, allocation of the target function unit; and
upon receipt of the allocation, dispatch the instruction to the target function unit.

11. The processor of claim 7, wherein the resource manager is further configured to flag the unavailability of the target function unit when the target function unit is allocated to an instruction.

12. The processor of claim 11, wherein the resource manager is further configured to unallocate an allocated function unit once the resource manager commits an execution result of the allocated function unit to a register file or memory.

13. The processor of claim 12, wherein the resource manager is configured to maintain a FIFO queue, wherein an earliest allocated function unit is at a head of the FIFO queue and a later allocated function unit is at a tail of the FIFO queue.

14. The processor of claim 13, wherein the FIFO queue comprises a plurality of subfields associated with an allocated function unit and wherein the subfields are in a same FIFO order as the allocated function units.

15. The processor of claim 7, wherein the resource manager is event triggered.

16. The processor of claim 7, wherein the resource manager is self-clocked.

17. The processor of claim 1, wherein the instruction dispatcher includes a scoreboard for maintaining a history of dispatched instructions.

18. The processor of claim 1, wherein the function unit includes an instruction buffer and the instruction is dispatched to the instruction buffer of a target function unit.

19. The processor of claim 1, wherein the processor is implemented in a network element.

* * * * *